United States Patent
Mattingly et al.

(10) Patent No.: US 12,482,031 B2
(45) Date of Patent: *Nov. 25, 2025

(54) SYSTEM AND METHOD FOR DETERMINING SHOPPING FACILITIES AVAILABLE FOR ORDER PICK UP

(71) Applicant: Walmart Apollo, LLC, Bentonville, AR (US)

(72) Inventors: Todd D. Mattingly, Bentonville, AR (US); Bruce W. Wilkinson, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,516

(22) Filed: Nov. 14, 2023

(65) Prior Publication Data
US 2024/0086994 A1    Mar. 14, 2024

Related U.S. Application Data

(63) Continuation of application No. 17/174,865, filed on Feb. 12, 2021, now Pat. No. 11,861,682, which is a
(Continued)

(51) Int. Cl.
*G06Q 30/0601* (2023.01)
*G06Q 10/083* (2024.01)
(Continued)

(52) U.S. Cl.
CPC ....... *G06Q 30/0635* (2013.01); *G06Q 10/083* (2013.01); *G06Q 10/087* (2013.01);
(Continued)

(58) Field of Classification Search
USPC ................................................ 705/26.1–27.2
See application file for complete search history.

(56) References Cited

U.S. PATENT DOCUMENTS

| 5,093,951 A | 3/1992 | Smith |
| 6,116,505 A | 9/2000 | Withrow |
| (Continued) | | |

FOREIGN PATENT DOCUMENTS

| WO | 2011054712 | 5/2011 |
| WO | 2014164831 | 10/2014 |
| (Continued) | | |

OTHER PUBLICATIONS

Cirillo, J. (2013). Tools of the trade: Industry warehousing pros weigh in on the solutions that keep their operations moving. Beverage World, 132(10), 56(5). Retrieved from https://dialog.proquest.com/professional/docview/1461615539?accountid=131444 (Year: 2013).*

(Continued)

*Primary Examiner* — Ashley D Preston
(74) *Attorney, Agent, or Firm* — Fitch, Even, Tabin & Flannery LLP

(57) ABSTRACT

In some embodiments, apparatuses and methods are provided herein useful to facilitating the vehicle pick up of orders at shopping facilities. In some embodiments, there is provided a system including: an electronic interface for receiving an order corresponding to a customer and for receiving a time period during which the customer requests to pick up the order; a control circuit configured to: determine the location of the customer; determine a plurality of shopping facilities near the customer's location; determine when the order would be available for pick up; determine the subset of shopping facilities where the order would be available within the time period requested by the customer; transmit the location to the customer; and at least one shopping facility where the order is made available for pick up by the customer during the requested time period.

18 Claims, 12 Drawing Sheets

Related U.S. Application Data continuation of application No. 15/705,413, filed on Sep. 15, 2017, now Pat. No. 10,943,289.

(60) Provisional application No. 62/397,568, filed on Sep. 21, 2016.

(51) Int. Cl.
*G06Q 10/087* (2023.01)
*G01C 21/34* (2006.01)

(52) U.S. Cl.
CPC ..... *G06Q 30/0633* (2013.01); *G06Q 30/0639* (2013.01); *G01C 21/34* (2013.01)

(56) References Cited

U.S. PATENT DOCUMENTS

| | | | |
|---|---|---|---|
| 6,366,220 B1 | 4/2002 | Elliott | |
| 6,367,696 B1 | 4/2002 | Inamitsu | |
| 6,573,884 B1 | 6/2003 | Kinzie | |
| 6,616,049 B1 | 9/2003 | Barkan | |
| 6,810,304 B1 | 10/2004 | Dickson | |
| 7,054,832 B1 | 5/2006 | Vallabh | |
| 7,110,958 B2 | 9/2006 | Yang | |
| 7,280,913 B2 | 10/2007 | Ruschkowski | |
| 7,590,567 B2 | 9/2009 | Hopson | |
| 7,853,492 B1 | 12/2010 | Kirklin | |
| 7,974,873 B2 | 7/2011 | Simmons | |
| 8,015,068 B2 | 9/2011 | Swamy | |
| 8,160,929 B1* | 4/2012 | Park | G06Q 30/00 705/26.1 |
| 8,392,262 B2 | 3/2013 | Mallick | |
| 8,738,449 B1 | 5/2014 | Cupps | |
| 9,171,327 B2 | 10/2015 | Nallu | |
| 9,172,738 B1 | 10/2015 | Dacosta | |
| 10,943,289 B2 | 3/2021 | Mattingly | |
| 11,346,684 B2 | 5/2022 | Sheha | |
| 11,861,682 B2 | 1/2024 | Mattingly | |
| 12,211,091 B2 | 1/2025 | Wilkinson | |
| 2001/0042007 A1 | 11/2001 | Klingle | |
| 2002/0143655 A1 | 10/2002 | Elston | |
| 2003/0177072 A1 | 9/2003 | Bared | |
| 2004/0210621 A1 | 10/2004 | Antonellis | |
| 2004/0254802 A1 | 12/2004 | Miller | |
| 2005/0228705 A1 | 10/2005 | Irwin | |
| 2007/0187183 A1 | 8/2007 | Saigh | |
| 2010/0088361 A1 | 4/2010 | Oliver | |
| 2010/0211426 A1 | 8/2010 | McClurg | |
| 2010/0294621 A1 | 11/2010 | Kolios | |
| 2011/0035299 A1* | 2/2011 | Casey | G07F 17/10 705/27.2 |
| 2011/0113347 A1 | 5/2011 | Apthorp | |
| 2012/0123674 A1* | 5/2012 | Perks | G06Q 30/0631 705/26.7 |
| 2012/0265561 A1 | 10/2012 | Patro | |
| 2013/0030875 A1 | 1/2013 | Lee | |
| 2013/0238451 A1 | 9/2013 | Riscalla | |
| 2013/0346237 A1 | 12/2013 | Rademaker | |
| 2014/0074743 A1 | 3/2014 | Rademaker | |
| 2014/0129951 A1 | 5/2014 | Amin | |
| 2014/0180959 A1 | 6/2014 | Gillen | |
| 2014/0188637 A1 | 7/2014 | Balasubramaniam | |
| 2014/0200940 A1 | 7/2014 | Putterman | |
| 2014/0257903 A1 | 9/2014 | Herscovici | |
| 2014/0279238 A1 | 9/2014 | Jones | |
| 2014/0330623 A1 | 11/2014 | Detrick | |
| 2015/0066798 A1 | 3/2015 | Gillen | |
| 2015/0088731 A1 | 3/2015 | Ackerman | |
| 2015/0100433 A1 | 4/2015 | Choy | |
| 2015/0178676 A1 | 6/2015 | Carr | |
| 2015/0227882 A1 | 8/2015 | Bhatt | |
| 2015/0228004 A1 | 8/2015 | Bednarek | |
| 2015/0294266 A1 | 10/2015 | Siragusa | |
| 2016/0063604 A1 | 3/2016 | Shaffer | |
| 2016/0148300 A1 | 5/2016 | Carr | |
| 2016/0239903 A1* | 8/2016 | Othmer | H04L 51/214 |
| 2016/0247113 A1* | 8/2016 | Rademaker | G06Q 10/083 |
| 2016/0353235 A1 | 12/2016 | Williams | |
| 2017/0011319 A1 | 1/2017 | Elliot | |
| 2017/0286884 A1 | 10/2017 | Shoval | |
| 2018/0082251 A1 | 3/2018 | Wilkinson | |
| 2018/0082352 A1 | 3/2018 | Mattingly | |
| 2018/0082353 A1 | 3/2018 | Mattingly | |
| 2018/0082356 A1 | 3/2018 | Wilkinson | |
| 2018/0082361 A1 | 3/2018 | Wilkinson | |
| 2021/0166297 A1 | 6/2021 | Mattingly | |
| 2021/0312534 A1 | 10/2021 | Wilkinson | |

FOREIGN PATENT DOCUMENTS

| | | |
|---|---|---|
| WO | 2015120506 A1 | 8/2015 |
| WO | 2016166708 A1 | 10/2016 |
| WO | 2018057498 | 3/2018 |

OTHER PUBLICATIONS

Tools of the trade: industry warehousing pros weight in on the solutions that keep their operations moving, published in Beverage World (2013) (Year: 2013).*

U.S. Appl. No. 18/387,361, filed Nov. 6, 2023, Wilkinson Bruce W.

"Adams, Tony, Car wash and chicken wing restaurant combo now under construction, Feb. 20, 2017, Ledger-Enquirer, p. 1" (Year: 2017).

Acehardware; "Free Store Pickup: in Stock in Store"; www.acehardware.com/helpdesk/index.jsp;jsessionid=CvcGWdpGDzyhlsm6xyvfSLGvhQC23LHWz9F3pbzsglZnb20GqhRQ!949789321?&display=ship; Jul. 7, 2016; pp. 1-2.

Belton, Padraig. Location services: How GPS delivery is changing shopping. Published by Business Reporter. Dec. 23, 2014. (Year: 2014).

Bensinger, Greg; "Amazon's New Secret Weapon: Delivery Lockers"; http://www.wsj.com/articles/SB10000872396390443545504577567763829784538; Aug. 7, 2012; pp. 1-4.

IMPI; App. No. MX/a/2019/003152; Office Action mailed Oct. 19, 2023; (pp. 1-14).

PCT; App. No. PCT/US2017/052201; International Search Report and Written Opinion mailed Jan. 18, 2018.

Shopify App Store; "Store Pickup + Delivery"; Store Pickup + Delivery—Ecommerce Plugins for Online Stores—Shopify App Store; https://apps.shopify.com/click-and-collect; Jul. 7, 2016; pp. 1-9.

Trefis: Two Factors That Support Our Bullish Outlook for Gap IncWeblog post. Newstex Finance & Accounting Blogs, Newstex. Sep. 29, 2015; retrieved from Dialog on Aug. 1, 2023 (Year: 2015).

USPTO; U.S. Appl. No. 15/705,413; Notice of Allowance mailed Nov. 3, 2020; (pp. 1-10).

USPTO; U.S. Appl. No. 15/705,413; Office Action mailed Jan. 30, 2020; (pp. 1-32).

USPTO; U.S. Appl. No. 15/705,413; Office Action mailed May 28, 2020, (pp. 1-14).

USPTO; U.S. Appl. No. 15/705,413; Office Action mailed Jul. 25, 2019; (pp. 1-26).

USPTO; U.S. Appl. No. 15/705,534; Office Action mailed Jan. 23, 2020; (pp. 1-24).

USPTO; U.S. Appl. No. 15/705,534; Office Action mailed Jul. 16, 2020, (pp. 1-22).

USPTO; U.S. Appl. No. 15/705,534; Office Action mailed Sep. 4, 2019; (pp. 1-19).

USPTO; U.S. Appl. No. 15/706,119; Notice of Allowance mailed Mar. 16, 2021; (pp. 1-13).

USPTO; U.S. Appl. No. 15/706,119; Office Action mailed Mar. 17, 2020; (pp. 1-16).

USPTO; U.S. Appl. No. 15/706,119; Office Action mailed Sep. 2, 2020; (pp. 1-13).

USPTO; U.S. Appl. No. 15/706,119; Office Action mailed Sep. 5, 2019; (pp. 1-21).

(56) References Cited

OTHER PUBLICATIONS

USPTO; U.S. Appl. No. 15/706,286; Office Action mailed Mar. 3, 2020; (pp. 1-32).
USPTO; U.S. Appl. No. 15/706,286; Office Action mailed Jul. 28, 2020, (pp. 1-32).
USPTO; U.S. Appl. No. 15/706,286; Office Action mailed Sep. 3, 2019; (pp. 1-26).
USPTO; U.S. Appl. No. 15/706,383; Notice of Allowance mailed Feb. 10, 2020; (pp. 1-13).
USPTO; U.S. Appl. No. 15/706,383; Office Action mailed Sep. 5, 2019; (pp. 1-29).
USPTO; U.S. Appl. No. 17/174,865; Non-Final Rejection mailed Mar. 24, 2023; (pp. 1-32).
USPTO; U.S. Appl. No. 17/174,865; Notice of Allowance and Fees Due (PTOL-85) mailed Aug. 14, 2023; (pp. 1-9).
USPTO; U.S. Appl. No. 17/345,775; Notice of Allowance and Fees Due (PTOL-85) mailed Aug. 7, 2023; (pp. 1-16).
IMPI, App. No. MX/a/2019/003152; Office Action mailed Jun. 13, 2024; (1-20 pages).
USPTO; U.S. Appl. No. 18/387,361; Notice of Allowance mailed Sep. 20, 2024; (pp. 1-17).
IMPI; App. No. MX/a/2019/003152; Office Action mailed Feb. 14, 2025; (pp. 1-24).

* cited by examiner

SYSTEM AND METHOD FOR DETERMINING SHOPPING FACILITIES AVAILABLE FOR ORDER PICK UP

CROSS-REFERENCE TO RELATED APPLICATIONS

This application is a continuation application of U.S. application Ser. No. 17/174,865, filed Feb. 12, 2021, which is a continuation application of U.S. application Ser. No. 15/705,413, filed Sep. 15, 2017, which claims the benefit of U.S. Provisional Application No. 62/397,568, filed Sep. 21, 2016, all of which are incorporated by reference in their entirety herein.

TECHNICAL FIELD

This invention relates generally to customer pick up of orders at shopping facilities, and more particularly, to arranging customer pick up of orders at shopping facilities where the order may be made ready prior to pick up.

BACKGROUND

In the retail setting, it is important to improve the convenient customer pick up of products and merchandise at shopping facilities. In one way, this convenience may be improved by allowing a customer to place or accept an order ahead of time and then by allowing the customer to drive up in a vehicle, pick up the order, and drive away. It would be desirable to further improve this convenience by adding additional features to the drive up shopping experience, such as enabling the customer to choose a desired time window for pick up, suggesting an available pick up time window to the customer, providing a map of pick up shopping facility locations and order availability, using the customer's driving patterns to suggest a time and place for pick up, and adding an automated vehicle wash in conjunction with pick up.

BRIEF DESCRIPTION OF THE DRAWINGS

Disclosed herein are embodiments of systems, apparatuses and methods pertaining to arranging customer pick up by vehicle of orders at shopping facilities. This description includes drawings, wherein.

Figure 1:
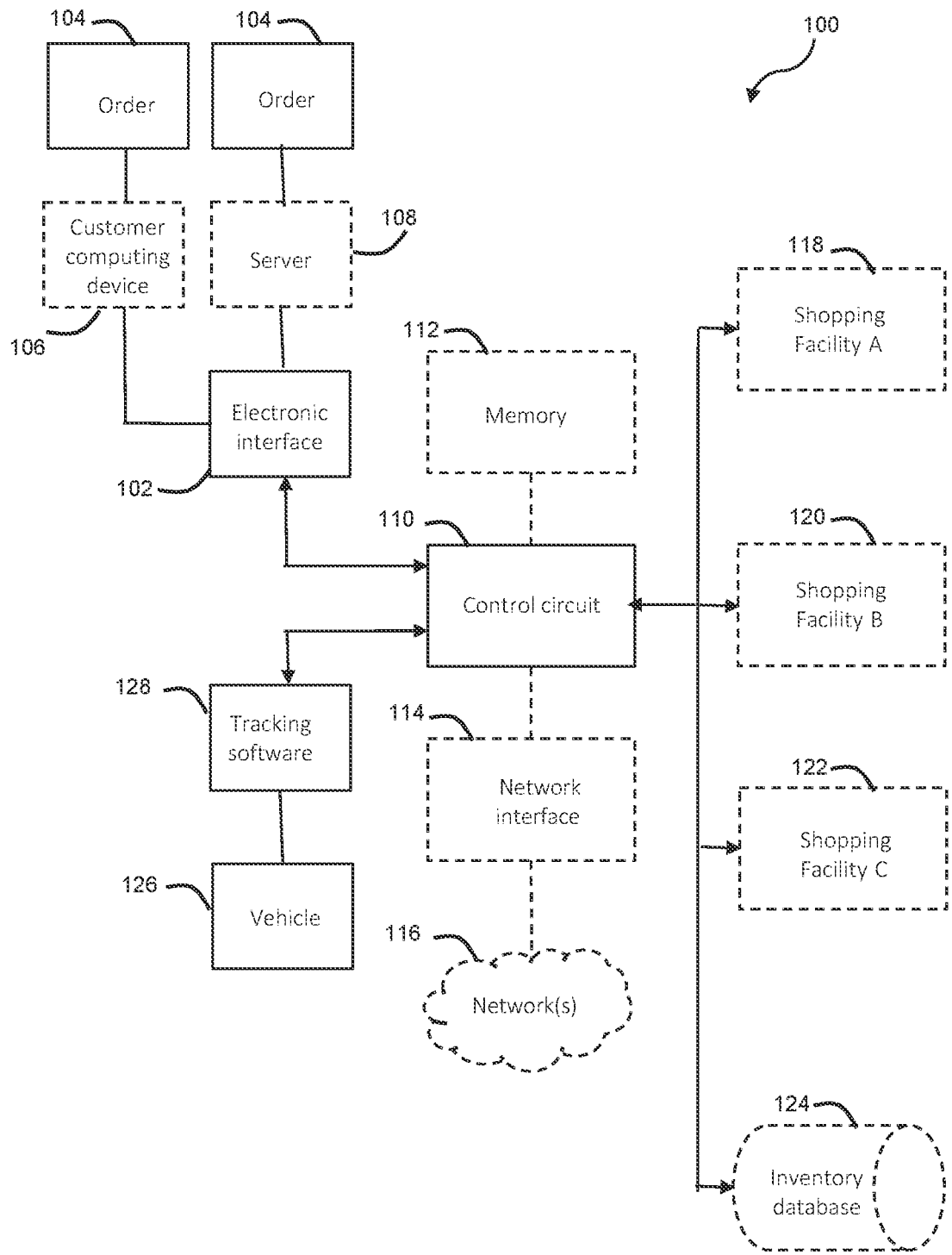
FIG. 1 is a block diagram in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to facilitating the vehicle pick up of orders at shopping facilities. In some embodiments, there is provided a system for arranging pick up of requested products at shopping facilities, the system including: an electronic interface configured to receive an order of at least one product corresponding to a customer and configured to receive a time period during which the customer requests to pick up the order at a shopping facility; a control circuit configured to: determine the location of the customer; determine a plurality of shopping facilities near the customer's location; determine when the order would be available for pick up at each shopping facility; determine a subset of shopping facilities where the order would be available at the shopping facility within the time period requested by the customer; transmit the location of at least one of the subset of shopping facilities to the customer; and at least one shopping facility where the order is made available for pick up by the customer during the requested time period.

In some forms, the system may further include a customer computing device for transmitting the order information and time period information to the electronic interface. In addition, in the system, the customer may input and transmit the customer's location to the control circuit. Moreover, in the system, the customer's location may be determined by software tracking a computing device of the customer, the tracking software including global positioning system tracking software.

In some forms, the electronic interface may include a shopping server configured to serve as a platform for the input of the order information and time period information to the electronic interface. Further, the control circuit may be configured to request that the customer select and transmit to the electronic interface the shopping facility where the customer intends to pick up the order. In addition, the control circuit may be configured to determine and transmit to the customer a route from the customer's location to the selected shopping facility. Also, the control circuit may be configured to determine the route using vehicle traffic and mapping software that selects the route based on real time traffic conditions and route information. Moreover, the control circuit may be configured to transmit confirmatory instructions to the selected shopping facility to make the order available during the requested time period.

In some forms, in the system, the control circuit may be configured to instruct that each shopping facility of the subset of shopping facilities make the order available during the customer time period without requesting customer confirmation. Further, the control circuit determination of when the order would be available for pick up at each shopping facility may include accessing at least one inventory database with inventory data for each of the shopping facilities to determine if each of the shopping facilities has the products requested in the order.

In some forms, the control circuit may be configured: to calculate the driving time from the customer's location to each of the subset of shopping facilities; to compare the order availability time at each of the subset of shopping facilities; to determine the shopping facility from the subset of shopping facilities that will allow the earliest pick up by the customer in view of driving time and order availability corresponding to each shopping facility; and to transmit the location of the shopping facility with the earliest pick up time to the customer. In addition, the control circuit may recalculate the driving time to the subset of shopping facilities at predetermined time intervals and transmit the location of the shopping facility with the earliest pick up time to the customer. Also, in the system, the control circuit may be configured: to calculate the driving time from the customer's location to the plurality of shopping facilities; to determine the order availability time at each of the plurality of shopping facilities; and to transmit a request for delivery to the customer's residence if the order will not be available during the time period requested by the customer at any of the plurality of shopping facilities in view of driving time and order availability corresponding to each shopping facility.

In another form, there is provided a method for arranging pick up of requested products at shopping facilities, the method including: by an electronic interface, receiving an order of at least one product corresponding to a customer; by the electronic interface, receiving a time period during which the customer requests to pick up the order at a shopping facility; by a control circuit: determining the location of the customer; determining a plurality of shopping facilities near the customer's location; determining when the order would be available for pick up at each shopping facility; determining a subset of shopping facilities where the order would be available at the shopping facility within the time period requested by the customer; and transmitting the location of at least one of the subset of shopping facilities to the customer.

Referring to FIG. 1, there is shown a system 100 that determines shopping facilities where a customer may pick up an order within a customer-desired time window. The customer may place or accept an order remotely and may indicate when he or she wants to pick up the order. The system 100 will then determine shopping facilities near the customer where the order will be available for pick up during the customer's desired time window and will communicate this information to the customer.

The system 100 includes an electronic interface 102 configured to receive an order 104 corresponding to a customer and to receive a time window when the customer wants to pick up the order 104 at a shopping facility. It is generally contemplated that this order may be created and transmitted in any of various ways. In one form, the customer may directly transmit this order 104 to the electronic interface 102. The customer may use any of various computing devices 106 to transmit the order information. For example, the customer may use a desktop computer at his residence or may use a tablet, smartphone, or other mobile handheld device. The customer may use the computing device 106 to access a website of a retailer or a software application and to input the various products that may constitute the order 104. Further, the customer may also the computing device 106 input a time window during which he would like to pick up the order. The terms "time," "time window," "time period," "time interval," "time slot," etc., may be used interchangeably herein to refer to a pick up time frame. In one form, the electronic interface may constitute a shopping server that is set up as a platform for the input of the order information and time period information to the electronic interface.

However, it is also contemplated that the order information may be generated without being initiated by a customer at all. For example, the order 104 may be suggested to a customer based on the customer's past purchase activity and customer preferences and as part of an effort to increase convenience to the customer. In this example, a server 108 may suggest an order 104 that includes one or more products that may be needed by the customer. Further, this order suggestion may be part of a practice of recurring orders 104 that may be suggested to a customer as part of some routine practice or procedure. For example, a customer may be prompted where a purchase history database indicates that certain types of products have not been purchased within a certain time period (such as within one or two weeks). User preferences may also be "learned" based on the options the customer has selected or not selected in the past, and in one form, these user preferences may be stored in profiles on a customer database. By making these suggestions to the customer, the system 100 may be able to eliminate or reduce one part of an individual's daily activity, thereby allowing the individual to focus on other matters requiring attention.

The system 100 also includes a control circuit 110 that is communicatively coupled to the electronic interface 102. As described herein, the language "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 110 may be configured (for example, by using corresponding programming stored in a memory as will be well understood by those skilled in the art) to carry out one or more of the steps, actions, and/or functions described herein.

As shown in FIG. 1, the control circuit 110 may be coupled to a memory 112, a network interface 114, and network(s) 116. The memory 112 can, for example, store non-transitorily computer instructions that cause the control circuit 110 to operate as described herein, when the instructions are executed, as is well known in the art. Further, the network interface 114 may enable the control circuit 110 to communicate with other elements (both internal and external to the system 100). This network interface 114 is well understood in the art. The network interface 114 can communicatively couple the control circuit 110 to whatever network or networks 116 may be appropriate for the circumstances. The control circuit 110 may make use of cloud databases and/or operate in conjunction with a cloud computing platform.

The control circuit 110 determines the location of the customer. It is contemplated that this determination may be accomplished in several different ways. For example, the customer may simply input and transmit his or her location. In one form, the customer may access a website or shopping server and may input the customer's address. In another form, the customer may give permission and provide access to tracking software on the customer's computing device. For instance, the control circuit 110 may be able to determine the customer's location using a global positioning system (GPS).

The control circuit 110 also determines shopping facilities near the customer's location. For example, the control circuit 110 may determine all of the shopping facilities of a specific retailer (although the stores need not be limited to a specific retailer) that are within a certain distance from the customer's location, such as within ten kilometers of the customer's location. The control circuit 110 may access a database identifying the store locations of the retailer or retailers in order to calculate which stores are within this maximum distance. Alternatively, the nearby shopping facilities may be determined based on a maximum travel time. As another alternative, the user may be prompted to provide a preference regarding the maximum distance or travel time desired from the customer's location, or the user preference may be determined based on the shopping facility locations where past purchases were made. In one form, such preference information may be stored in profiles in a customer database.

The control circuit 110 is configured to determine when the order would be available for pick up at each shopping facility. In one form, the control circuit 110 may communicate with each shopping facility individually to determine when the order might be available for pick up at that particular shopping facility and to determine any other relevant store information, such as inventory and store hours. In FIG. 1, the control circuit 110 is shown in communication with Shopping Facility A (118), Shopping Facility B (120), and Shopping Facility C (122). As will be understood, FIG. 1 just shows one example of the number of shopping facilities involved, and this number may increase or decrease depending on the circumstances. This approach may involve communicating with an individual at each shopping facility to determine availability of the order 104. Alternatively, this approach may involve communicating with servers and/or databases at each shopping facility, such as to determine the inventory at each shopping facility (to confirm that all of the products are available). After confirming availability, the control circuit 110 may then calculate an estimated availability time window at each shopping facility.

In another form, the control circuit 110 need not communicate individually with each shopping facility at all. For example, the control circuit 110 may communicate with a centralized inventory database 124 that allows the control circuit 110 to confirm that all of the products in the order are available at the shopping facilities. In one form, the inventory database 124 may contain inventory data for each of the shopping facilities, which allows a determination if each of the shopping facilities has the products requested in the order. Again, the control circuit 110 may then calculate an estimated availability time window at each shopping facility.

The control circuit 110 may then compare the estimated availability time window at each shopping facility with the time window requested by the customer. Based on this comparison, it may determine the subset of shopping facilities where the order would be available within the time period requested by the customer. So, for example, of the three shopping facilities shown in FIG. 1, it may be determined that only Shopping Facility A (118) and/or Shopping Facility B (120) will have the order available within the customer-specified time window. In making this calculation, the control circuit 110 may also consider the driving distance and routes between the customer and the shopping facilities. For example, the control circuit 110 may select a subset of shopping facilities where the customer's departure and arrival times to and from each shopping facility fall within the customer's desired time window. The control circuit 110 may access conventional street navigational software applications to make these calculations.

Following this determination, the control circuit 110 may then transmit the location of one or more of these shopping facilities to the customer. For example, it may be determined that both Shopping Facility A (118) and Shopping Facility B (120) will have the order available. The control circuit 110 may be configured such that only one of these shopping facility options will be communicated to the customer, such as, for example, the shopping facility closest to the customer. The customer may then be prompted to indicate acceptance of this time and place for pick up of the order. Alternatively, all of the shopping facility options (Shopping Facility A (118) and Shopping Facility B (120)) may be communicated to the customer. In this instance, the customer may be prompted to select one of the shopping facility options for pick up. In other words, the control circuit 110 may be configured to request that the customer select and transmit to the electronic interface 102 the shopping facility where the customer intends to pick up the order.

After a shopping facility is selected, the control circuit 110 may be configured to provide driving instructions for the customer to the shopping facility. In other words, the control circuit 110 may determine and transmit to the customer a route from the customer's location to the selected shopping facility. As addressed above, the control circuit 110 may interact with conventional street navigational software applications to determine the route. Further, using these software applications, the control circuit 110 may determine the route using vehicle traffic and mapping software that selects the route based on real time traffic conditions and route information. In addition, this route calculation may be used to suggest a departure time for the customer so that the customer arrives at the selected shopping facility within the customer's desired pick up time window.

Following acceptance by the customer, the control circuit 110 may communicate this acceptance to the selected shopping facility (such as to a point of sale system at the selected shopping facility). In other words, the control circuit 110 may be configured to transmit confirmatory instructions to the selected shopping facility to make the order available during the requested time period. Further, the control circuit 110 may communicate to the other shopping facilities that were part of the inquiry and inform these other shopping facilities that they need not make the order available because the customer is picking up the order at a different shopping facility. This approach may be desirable to avoid having shopping facilities make preparations when the customer has decided to go elsewhere.

However, in another form, it may be desirable to provide additional convenience to the customer by making the order available at multiple shopping facilities. In other words, the control circuit 110 may be configured to instruct that each shopping facility of the subset of shopping facilities make the order available during the customer time period without requesting customer confirmation. This approach might be used where the customer has not selected any specific shopping facility for the pick up. Alternatively, this approach might be desirable to give the customer multiple pick up options at multiple nearby shopping facilities.

In another form, it is contemplated that the customer may place, accept, or modify the order while driving in his or her vehicle 126. For example, the customer may be using a mobile device with tracking software 128 to do so (such as a smartphone with GPS tracking software). Alternatively, the customer may be able to access any updates to the availability and pick up of the order via a mobile device while he or she is traveling.

In this context, the control circuit 110 may be configured to provide the earliest pick up availability of the order at nearby shopping facilities. In making this determination, the control circuit 110 may calculate the driving time from the customer's location to each of a subset of shopping facilities (such as via a combination of GPS and navigational software); compare the order availability time at each of the shopping facilities; determine the shopping facility that will allow the earliest pick up by the customer in view of driving time and order availability at each shopping facility; and transmit the location of the shopping facility with the earliest pick up time to the customer.

Further, the control circuit 110 may make periodic, dynamic recalculations. In other words, the control circuit 110 may be configured to recalculate the driving time to each shopping facility at predetermined time intervals and to transmit the location of the shopping facility with the earliest pick up time to the customer. The control circuit 110 may suggest a new shopping facility for pick up if it has an earlier pick up time than a previously suggested shopping facility.

In addition, the control circuit 110 may provide a home delivery option if none of the nearby shopping facilities will have the order available within the time window desired by the customer. For example, the control circuit 110 may be configured to calculate the driving time from the customer's location to multiple, nearby shopping facilities (such as via GPS and navigational software); determine the order availability time at each shopping facility; and transmit a request for delivery to the customer's residence if the order will not be available during the time period requested by the customer at any of the shopping facilities in view of the driving time and order preparation/assembly time.

It is also contemplated that the system 100 may make parts of the order available at multiple, nearby shopping facilities, i.e., it may make the order available piecemeal. For example, the order may contain primarily readily available products along with one specialty product that is not readily available. The readily available products may be available within the customer's time window at one shopping facility, while the specialty item may be available at a different shopping facility within the time window. In this circumstance, the control circuit 110 may suggest these multiple shopping facilities to the customer. As another example, the customer may desire to pick up certain items first (such as perishable items) at one shopping facility and then pick up certain remaining items later (such as nonperishable items).

Alternatively, in the above example, the specialty item may not be available at all. In other words, the readily available products may be available within the customer's time window at one shopping facility, while the specialty item will not be available at any shopping facility within the time window. In this circumstance, the control circuit 110 may suggest one or more possible shopping facilities for pick up of the readily available items and may suggest home delivery for the specialty item.

Additional options may be provided. For example, a point of pick up option may be provided as a choice to the customer, such as pick up at a locker, drive through area, or at a cashier in the shopping facility. These options and other options/choices may be prioritized and recommendations may be made to the customer. Options may be generated based on the customer's inputted time window, customer preferences (user priority of pickup, locker, in store; maximum distance willing to be traveled to a store; maximum distance willing to be traveled between multiple stores), purchase/reorder frequency, location of the user, the time of day, store hours, etc. Further, to provide convenience to the customer, the system 100 may learn customer preferences based on the options previously accepted or rejected by the customer.

Accordingly, in one form, the system 100 relates generally to identifying one or more stores where certain products desired by a customer are available during a specified time window for pick up by the customer. In one form, the customer may input an order and a desired time window into the system 100. The customer may also input his location or this may be determined by the system 100. The system 100 may perform a real time check of the inventory at nearby stores that may be partially or completely available to the customer during the specified time window. The customer may be directed to the store location with the shortest inventory wait time to pick up the product(s), and/or the system 100 may identify all stores that will have the inventory available during the specified time window. The customer may choose to pick up multiple products at multiple store locations (rather than wait at any one store), or the customer may choose to wait for a complete order for multiple products at one store. The system 100 may also provide home delivery as an option, especially if the inventory will not be available during the specified time window at any stores.

Figure 2:
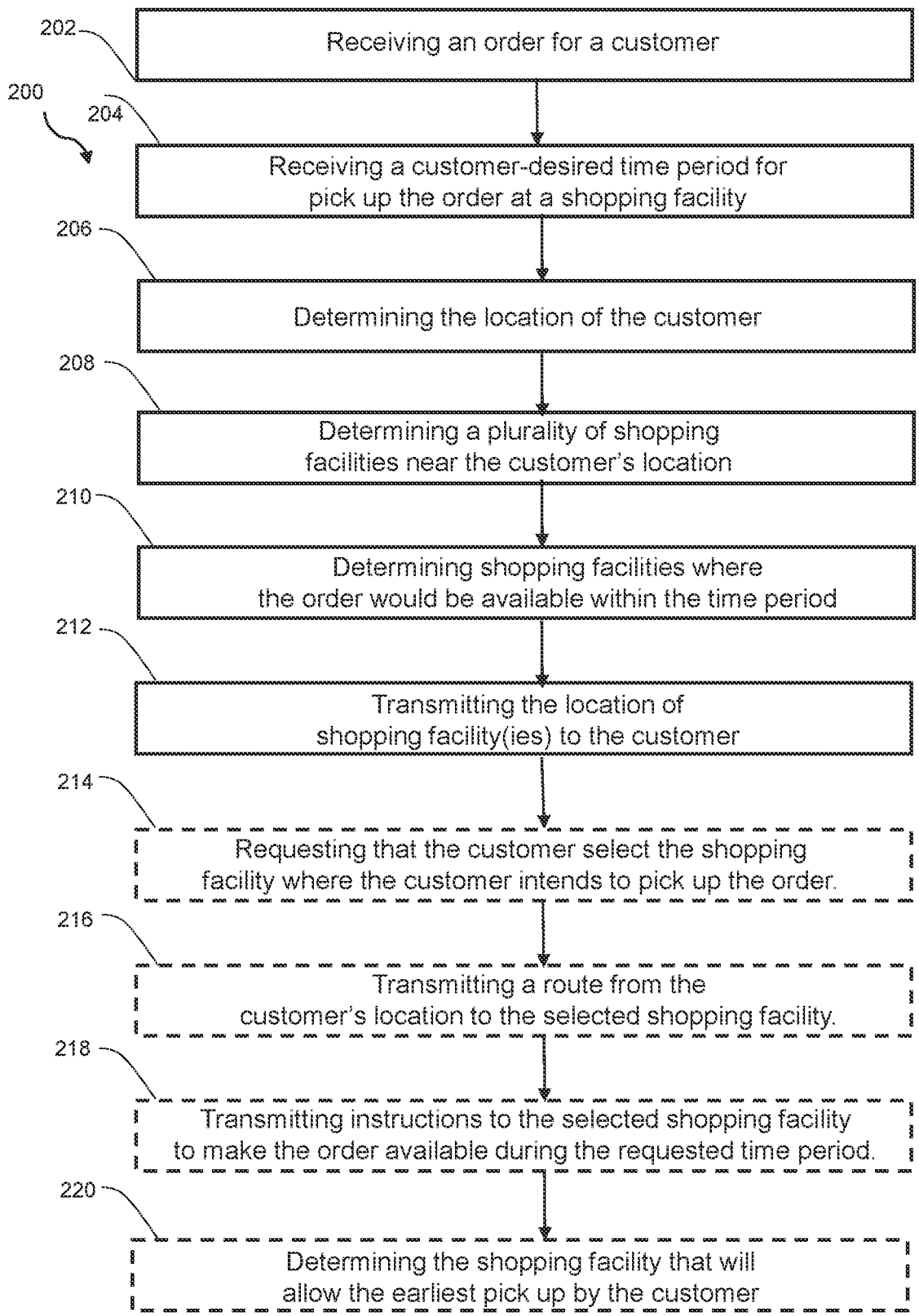
FIG. 2 is a flow diagram in accordance with several embodiments.

Referring to FIG. 2, a process 200 is shown for arranging for the pick up of an order at a shopping facility within a desired time window. The process 200 may use some or all of the components from the system 100 described above. The process 200 allows for a customer to input or accept an order and a desired, convenient time for pick up of the order at a shopping facility. The process 200 determines one or more shopping facilities near the customer's location where the customer can pick up the order.

At block 202, an order for a customer is received, and this order may be received in several ways. In one form, the order may be directly placed by a customer and may be received at an electronic interface. For example, the customer may use a computing device to access a retailer's website or access a software application to input the order with the retailer, and the customer could also communicate the order orally by phone. Alternatively, however, the order need not be directly placed by a customer at all. In another form, the order may be generated by a retailer (such as via a shopping facility, server, or centralized computing system), rather than the customer, and the order may be a suggestion transmitted to the customer for consideration and acceptance. As a further example, the order may be part of a recurring pattern and practice of proposed purchases and might not require express acceptance by the customer.

At block 204, a customer-desired time period for pick up of the order is received, and the customer will pick up the order at a shopping facility. In one form, the customer may directly place the order and may input a desired time period for pick up as part of the ordering process. This ordering process may be initiated by the customer through the customer's computing device. In another form, the customer may request a certain desired time period in response to a generated order provided to minimize some of the mundane daily activities required of the customer.

At block 206, the location of the customer is determined. In one form, the customer may initiate the order and may input the location, such as the customer's residence. Alternatively, the customer may provide certain identification information, and the customer's residence information may be available from a database, such as might arise from past purchases made by the customer. In another form the location of the customer may be determined by tracking software. For example, the customer may be traveling in a vehicle, and the location of the customer may be determined by providing access to tracking software (such as GPS on a smartphone).

At block 208, once the location of the customer is determined, the locations of nearby shopping facilities can be determined. In one form, it is contemplated that the universe of possible shopping facilities may be shopping facilities owned, managed, or supervised by one retailer (although they need not be limited to one retailer). Information regarding the locations of these shopping facilities is readily available to the retailer. A maximum travel distance may be selected, and the universe of shopping facilities may include all those that are within this maximum distance from the customer's location. Alternatively, a maximum travel time may be selected, and navigational software may be used to determine the universe of shopping facilities that are within this maximum travel time. Additionally, as another alternative, the user may be prompted to provide a preference regarding the maximum distance or travel time desired, or user preferences may be determined based on past behavior.

At block 210, the subset of nearby shopping facilities that can make the order available within the desired time period is determined. This determination may be accomplished in various ways. In one form, a control circuit may communicate with each of the universe of shopping facilities to determine which shopping facilities have the requested products and to determine a preparation/assembly time at each shopping facility. In another form, the control circuit may communicate with an inventory database at each shopping facility (or order fulfillment database or system) to determine product availability and make an estimate of preparation/assembly time. In yet another form, the control circuit need not communicate with each shopping facility individually but may instead communicate with a centralized inventory database to determine product availability at each shopping facility (and may make an estimate of preparation/assembly time). In some forms, the estimated travel time (such as may be available from navigational software) may be considered in making the determination. For example, the control circuit may determine shopping facilities where the departure time from the customer's location and the arrival time at the shopping facility are both within the time period.

At block 212, once the subset of nearby shopping facilities is determined, the location of one or more of these shopping facilities may be transmitted to the customer. In one form, all of the available nearby shopping facilities may be transmitted to the customer for the customer's consideration. This approach may provide the customer with the most convenience. In another form, one specific shopping facility (such as the one closest to the customer's location) may be chosen and transmitted to the customer. This approach may provide the retailer with the most predictability.

At block 214, the customer may be requested to select the shopping facility where the customer would like to pick up the order. The customer may be asked to select from multiple shopping facility options or may be asked to confirm a proposed shopping facility. At block 216, after a shopping facility is selected, a route may be transmitted to the customer showing a route from the customer's location to the selected shopping facility. In one form, as addressed above, this route may be calculated using conventional street/route navigational software applications.

At block 218, instructions may be sent to the selected shopping facility to make the order available during the customer-desired time period. In addition, instructions may be sent to other shopping facilities that may have received communications about the customer's order indicating that they need not make the order available. As addressed above, this step is optional. In some forms, it may be desirable to have the order made available at multiple shopping facilities for customer convenience such that instructions need not be sent at all.

At block 220, the shopping facility that will allow the earliest pick up may be determined. This earliest pick up time may be calculated by considering driving time from the customer location to each facility, order preparation/assembly time, and order availability. In one form, it is contemplated that the customer may place the order while driving in his vehicle such that the earliest pick up time may be desirable.

Figure 3:
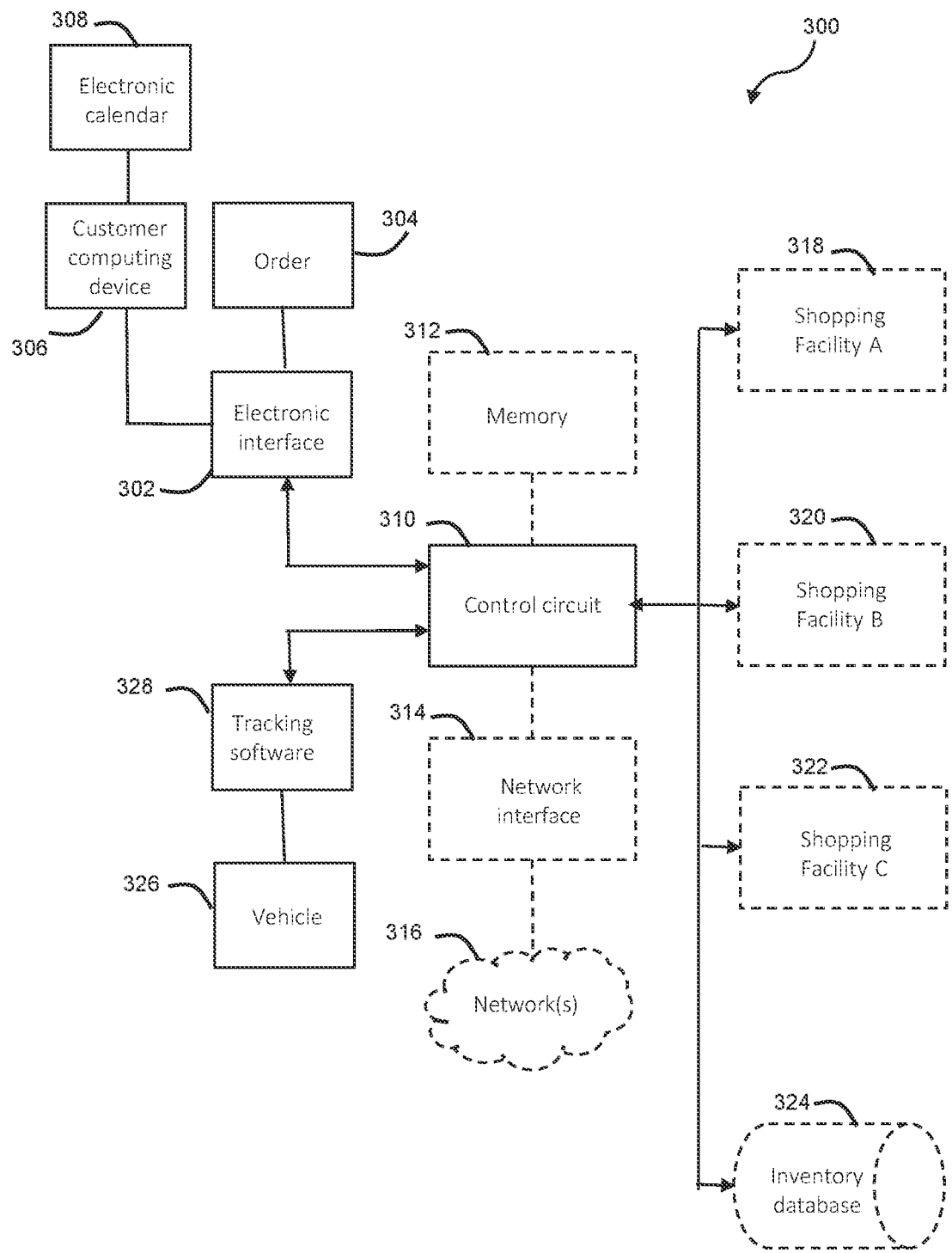
FIG. 3 is a block diagram in accordance with several embodiments.

Now, referring to FIG. 3, another form of a system 300 is shown. The system 300 operates in a manner similar to system 100 above in certain ways (and the discussion above is incorporated herein), but it makes use of a customer's electronic calendar. More specifically, it is contemplated that the customer has given permission to access his or her electronic calendar to schedule possible time windows for order pick up at shopping facilities. It is contemplated that this approach may provide additional convenience to the customer and may eliminate or reduce the need for the customer to remember to arrange for pick up. Instead, the system 100 may choose a time window and, in effect, may provide the customer with a reminder about the order pick up.

The system 300 includes an electronic interface 302 that receives an order 304 corresponding to a customer. As described above with respect to system 100, it is generally contemplated that this order 304 may be received under a variety of approaches. For example, the order 304 may be directly submitted by a customer accessing a website (such as a retailer website) or software application. In one form, electronic interface 302 may be in the form of a shopping server configured to serve as a platform for the input of the order information.

It is also contemplated that the order 304 may be submitted without being directly initiated by the customer. Instead, the order 304 may be generated as part of an algorithm that considers the needs of customers and that may generate orders on a recurring basis. In one form, past purchases of the customer may be considered (as well as their timing) and customer preferences to determine whether additional products might be desired at a current time. In this form, an order may be internally generated and received at the electronic interface (such as at the shopping server or other computing platform).

However, in contrast to system 100, the system 300 makes use of an electronic calendar 308 on the customer's computing device 306. This computing device 306 may be any of various types of devices that can include an electronic calendar 308, such as desktop computers, tablets, smartphones, etc. In one form, the customer may access a website (such as a retailer website) or software application when placing an order 304 and may be presented with the option of providing access to the customer's electronic calendar 308 to identify possible pick up times and time windows. In other words, the customer may be given an option of convenience of allowing the system 300 to determine possible order pick up times and time windows, and the customer may give permission for access to the electronic calendar 308 (or share the electronic calendar). In this manner, the customer does not have to remember to do so himself periodically. This approach may be used in conjunction with the system 300 suggesting possible orders on a recurring basis. Thus, the system 300 may periodically and on a recurring basis suggest possible orders for pick up and, at the same time, suggest possible pick up times (after determining available times from the customer's electronic calendar 308).

Like system 100, the system 300 includes a control circuit 310 that is communicatively coupled to the electronic interface 102 and that controls operation of the system 300. The term "control circuit" generally has the same meaning and generally refers broadly to the type of control circuit 110 described above. It may be coupled to a memory 312, a network interface 314, and network(s) 316. The general nature of control circuit 310, memory 312, network interface 314, and network(s) 316 were described above and are well understood in the art.

The control circuit 310 uses the customer's electronic calendar to propose a possible pick up time to the customer. The control circuit 310 accesses the customer's electronic calendar; determines one or more time periods from the electronic calendar during which the customer is available to pick up the order 304 at a shopping facility; transmits an invitation to the customer to pick up the order 304 during the identified time period(s); and receives a response to the invitation in which the customer accepts one of the time period(s) for pick up of the order 304, rejects the time period(s) for pick up, or proposes a new time period for pick up.

In one form, the customer may know a specific nearby shopping facility where he or she desires to pick up the order 304. The control circuit 310 may be configured to request that the customer select and transmit a shopping facility where the customer intends to pick up the order 304. Further, if the customer selects a shopping facility, the control circuit 310 may transmit instructions to the selected shopping facility (such as to a point of sale system at the selected shopping facility) to make the order 304 available during the requested time period. In addition, the control circuit 310 may be configured to access an inventory database 324 to determine if the selected shopping facility has the product(s) requested in the order 304.

In another form, the control circuit 310 may provide the customer with an assortment of possible nearby shopping facilities for pick up (such as Shopping Facility A (318), Shopping Facility B (320), Shopping Facility C (322), etc.). The control circuit 310 may determine the location of the customer; determine shopping facilities near the customer's location; and transmit the shopping facilities to the customer. In one form, the customer's location may be determined by simply requesting that the customer input and transmit the customer's location. Alternatively, the customer's location may be determined by software tracking the computing device 306 of the customer (such as by GPS). Once the control circuit 310 transmits possible nearby shopping facility(ies), it may be configured to request that the customer select the shopping facility where the customer intends to pick up the order. Further, once a selection has been made, the control circuit 310 may determine and transmit to the customer a route from the customer's location to the selected shopping facility. The control circuit 310 may determine the route using vehicle traffic and mapping software that selects the route based on real time traffic conditions and route information, such as through the use of conventional navigational software.

In addition, the control circuit 310 may be configured to propose time windows to the customer early enough so as to give shopping facilities enough time to prepare the order. For example, a minimum time interval may be selected (e.g., 4-5 hours), and the control circuit 310 will select open time slots on the electronic calendar 308 that are, at least, this minimum time interval after the current time (or after the time the invitation is transmitted to the customer). In other words, the control circuit 310 may be configured to transmit the invitation to the customer at least a certain time interval prior to the proposed time period (s) for customer pick up, which represents a minimum amount of time for a shopping facility to prepare the order for pick up by the customer. Further, the control circuit 310 may be configured to select time slots on the electronic calendar 308 that are a certain minimum time in length so as, for example, to give the customer enough time to travel to the shopping facility and pick up the order.

Further, the control circuit 310 may be configured to propose a new time window if the customer saves a conflicting event on his electronic calendar 308. In some forms, the control circuit 310 may check the electronic calendar 308 periodically to determine if there is a conflicting event or may check the electronic calendar 308 just once, such as a short time (e.g., 1 hour) before the scheduled pick up. If there is a conflict, the control circuit 308 may propose new pick up times. In other words, the control circuit 310 may be configured to: access the electronic calendar 308 after acceptance of the invitation by the customer; determine if a subsequently entered calendar event interferes with the accepted pick up time; re-determine new time period(s) from the electronic calendar 308 during which the customer is available to pick up the order 304 at a shopping facility; and re-transmit a new invitation to the customer to pick up the order 304 during the at least one time period.

As addressed above, a proposed order 304 of products may be sent to the customer once or on a recurring basis. In one form, the control circuit 310 may determine a proposed order (such as based on purchase history, the length of time since the last purchase of certain merchandise, and/or customer preferences in a customer database) and send it to the customer for consideration. In one form, the control circuit 310 may be configured to: determine the order 304 of product(s) corresponding to the customer; transmit the order 304 as a proposal to the customer; and receive a confirmation for the order 304 for the order 304 from the customer.

Accordingly, in one form, the system 300 relates generally to identifying an available "time window" on a customer's electronic calendar 308 and then sending an invite for a customer to pick up an order 304 of products. The customer may input an order 304 of products ("grocery list"), or desired products may be determined in some manner. The customer may share his electronic calendar 308 with ("opt into") the system 300, which may permit the system 300 to identify possible pick up "time windows" for the customer. The system 300 may determine an available free "time window" for pick up from the calendar 308 and send a calendar invite to the customer. The customer's acceptance of the invite may constitute placing an order 304 for pick up during this "time window." If a new calendar event is entered later that interferes, the system 300 may find an available "time window" nearby and re-send an invite to the customer. The system 300 may identify possible nearby stores based on the customer's location, or the customer may select a specific store. The system 300 may select a suitable "time window" that will give a store enough time to stock the customer's order 304 prior to that pick up "time window."

Figure 4:
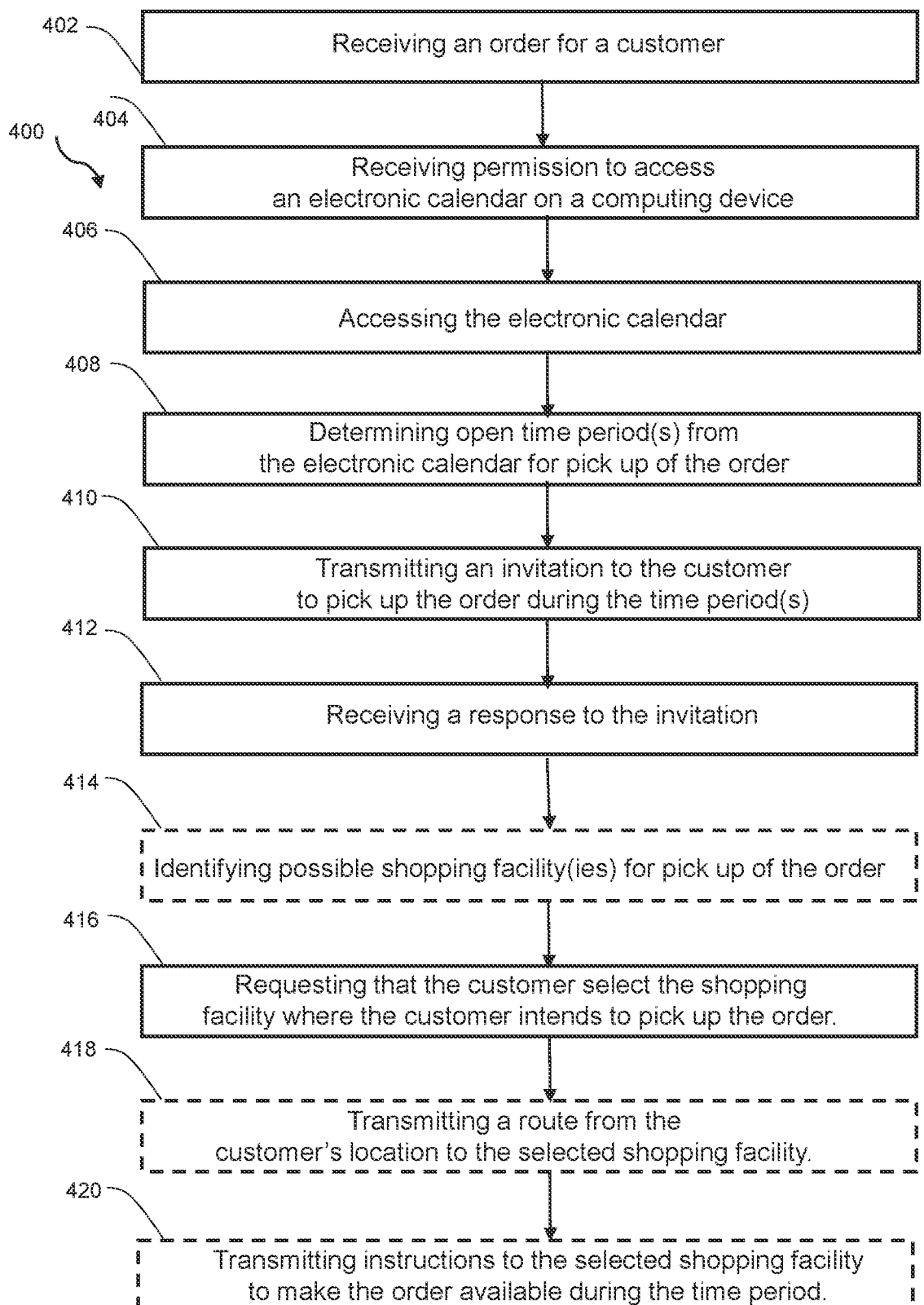
FIG. 4 is a flow diagram in accordance with several embodiments.

As illustrated in FIG. 4, there is shown a process 400 for arranging for the pick up of an order at a shopping facility using an electronic calendar from a customer's computing device. The process 400 may use some or all of the components from the system 300 described above. The process 400 allows for a customer to input or accept an order and searches the electronic calendar for available time slots for pick up by the customer. The customer may then select a nearby shopping facility for pick up of the order.

At block 402, an order for a customer is received. In one form, the order may be directly placed by a customer and may be received at an electronic interface. For example, the customer may use a computing device to access a retailer's website or to access a software application to input the order with the retailer. Alternatively, however, the order need not be directly placed by a customer at all. In another form, the order may be generated by a retailer (such as via a centralized computing system), and the order may be a proposal transmitted to the customer for consideration. As a further example, the order may be part of a recurring pattern of proposed orders that may be generated based on the customer's purchase history, the elapsed time since the last purchase of certain merchandise, and/or customer preferences in a customer database.

At block 404, permission to access an electronic calendar on a computing device is received (and the customer shares his or her electronic calendar). In one form, it is contemplated that this permission may be stored a customer preference in a customer database. For example, this permission may be requested during an initial purchase via a website or software application. In other words, the process 400 may include: receiving permission for access to the customer's electronic calendar prior to receipt of the order; storing the customer's permission for access to the customer's electronic calendar in a customer database; and accessing the customer database to determine if permission has been granted for subsequent orders.

At block 406, the electronic calendar is accessed. For example, a control circuit may access the electronic calendar and may search for open time slots where the customer may be available to pick up of the order. In one form, the process 400 may include certain parameters for the time slot, such as the time slot must be a certain minimum time after an invitation is sent to the customer. This minimum time may be desirable in order to give the customer sufficient time to travel to the selected shopping facility and/or in order to give the shopping facility sufficient time to prepare and assemble the order. In one form, another parameter may be that the time slot must be of a certain minimum duration, such as to provide the customer with sufficient time for travel to the shopping facility and pick up of the order. Further, another parameter may be that the time slot must be within a certain number of days from sending of an invitation to the customer.

At block 408, open time period(s) from the electronic calendar for pick up of the order are determined. For example, a control circuit may determine open time period(s) that satisfy the above parameters (minimum time and minimum duration). In addition, there may be an additional parameter regarding the number of open time period(s) determined. In one form, the control circuit may determine one open time period for suggestion or may provide the customer with the option of selecting from multiple open time periods. Further, another parameter may be to limit the open time period(s) to day and/or evening hours (i.e., no late night scheduling of pick ups).

At block 410, an invitation is transmitted to the customer. The invitation includes one or more open time periods for pick up of the order. In one form, a control circuit may transmit a prompt to select one or more of the open time periods for pick up. At block 412, a response to the invitation is received. In one form, it is contemplated that, in the response, the customer may accept one of the suggested time period(s) for pick up of the order, may reject the suggested time period(s) for pick up of the order, or may propose a new time period for pick up of the order.

At block 414, possible shopping facility(ies) may be identified for pick up of the order. In one form, it is contemplated that the customer may have a desired shopping facility in mind and may be prompted to select that shopping facility (and this step of process 400 may not be necessary). In other words, a control circuit may request that the customer select and transmit a shopping facility where the customer intends to pick up the order. In another form, it is contemplated that a group of nearby shopping facilities will be suggested to the customer for selection of one of the shopping facilities for pick up. In this form, for example, a control circuit may determine the location of the customer; determine shopping facility(ies) near the customer's location; and transmit the shopping facility(ies) to the customer. The control circuit may then request that the customer select and transmit the shopping facility where the customer intends to pick up the order.

At block 418, a route from the customer's location to the selected shopping facility may be transmitted. It is generally contemplated that this step of the process 400 may be performed whether the customer selected one shopping facility from an assortment of suggested shopping facilities. In this circumstance, the customer may not be familiar with the location of and route to this shopping facility.

At block 420, instructions are transmitted to the selected shopping facility to make the order available during the accepted time period. This step allows the selected shopping facility sufficient notice and time to assemble the customer's order. Additional parameters may be included for this step. For example, the instructions may be sent a certain minimum time prior to the pick up time corresponding to the minimum time required by the shopping facility to prepare and assemble the order. In one form, it is also contemplated that these instructions may be coordinated with the access to the customer's electronic calendar so as to permit advance preparation and assembly of the customer items to be done efficiently prior to the pick up time window for the customer.

In one form, step 420 may also include confirming that the selected shopping facility has the products that make up the order. This confirmation may take several forms, such as communicating with an employee of the shopping facility to confirm that the products are in inventory or accessing a shopping facility server for this confirmation. In other words, a control circuit may access an inventory database or order fulfillment database/system for the selected shopping facility (or a centralized inventory database) to confirm that the selected shopping facility has the products requested in the order. If the products are not available within the time window, then an alternative shopping facility may be proposed and/or selected.

Figure 5:
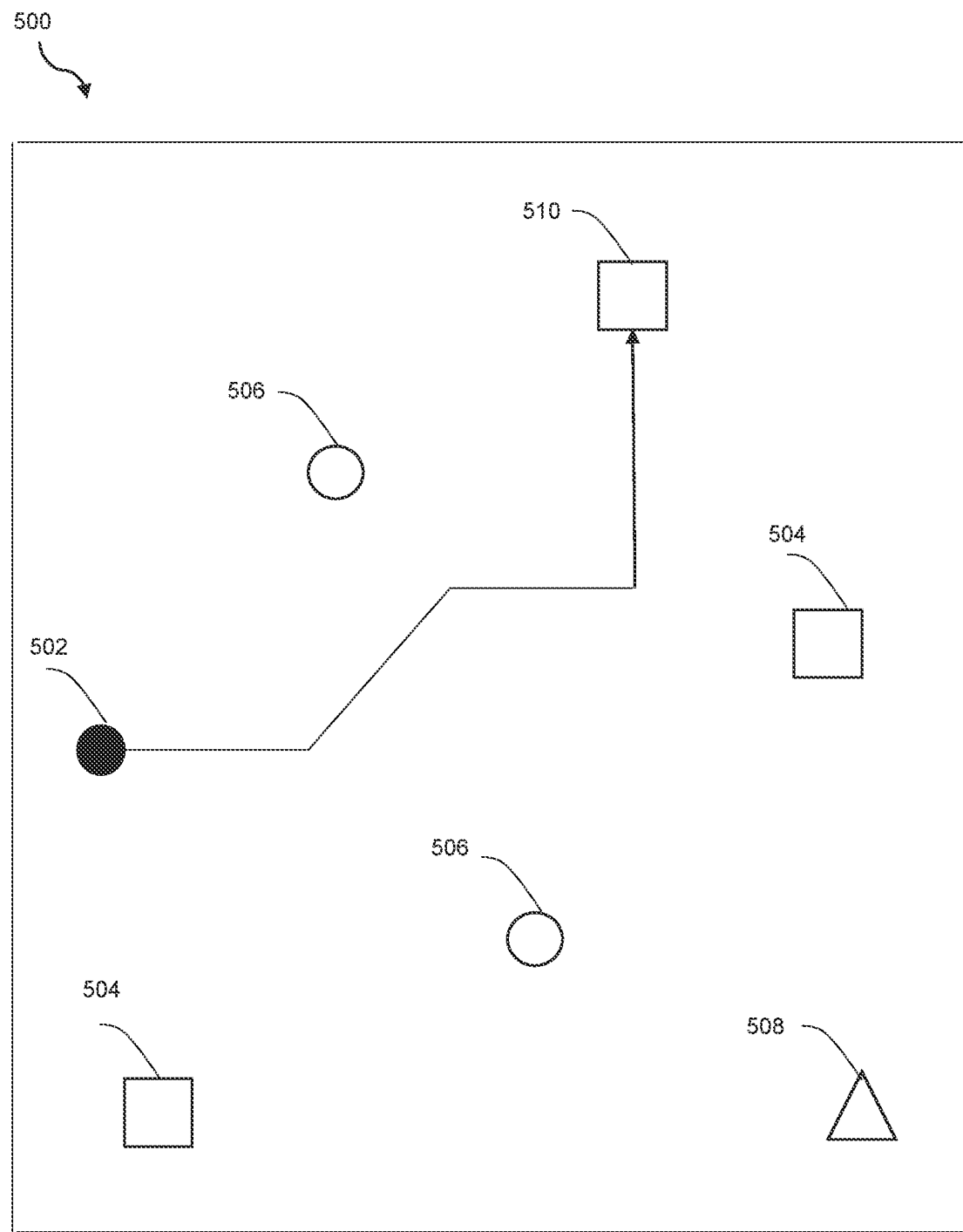
FIG. 5 is a schematic diagram of a visual representation in accordance with several embodiments.

Referring now to FIG. 5, there is shown a schematic diagram of a visual representation 500 on a display device that may be used generally in conjunction with systems 100 and 300 (or by itself). FIG. 5 shows the display of shopping facilities with different availability times for a customer's order. It is generally contemplated that the visual representation is shown on a geographic or navigational map that shows the customer's location as well as the general neighborhood or surrounding vicinity where nearby shopping facilities are located. This visual representation 500 provides availability information and assists the customer in making a decision as to where to pick up the customer's order.

In FIG. 5, the different symbols correspond to the customer's location and to different availability times. For example, the filled-in circle symbol 502 represents the customer's location, the square symbols 504 represent shopping facilities where the order is available in one hour, the unfilled circle symbols 506 represent shopping facilities where the order is available in four hours, and the triangle symbol 508 represents a shopping facility where the order is available the next day. In this example, a shopping facility has been selected for pick up of the order (square symbol 510), and as can be seen, a route has been calculated from the customer's location 502 to the selected shopping facility 510. As should be evident, the visual representation 500 may use other symbols, color coding, or numeric values (rather than the specific symbols shown in FIG. 5). The visual representation 500 is incorporated into and described in further detail below in connection with system 600 and process 700.

Figure 6:
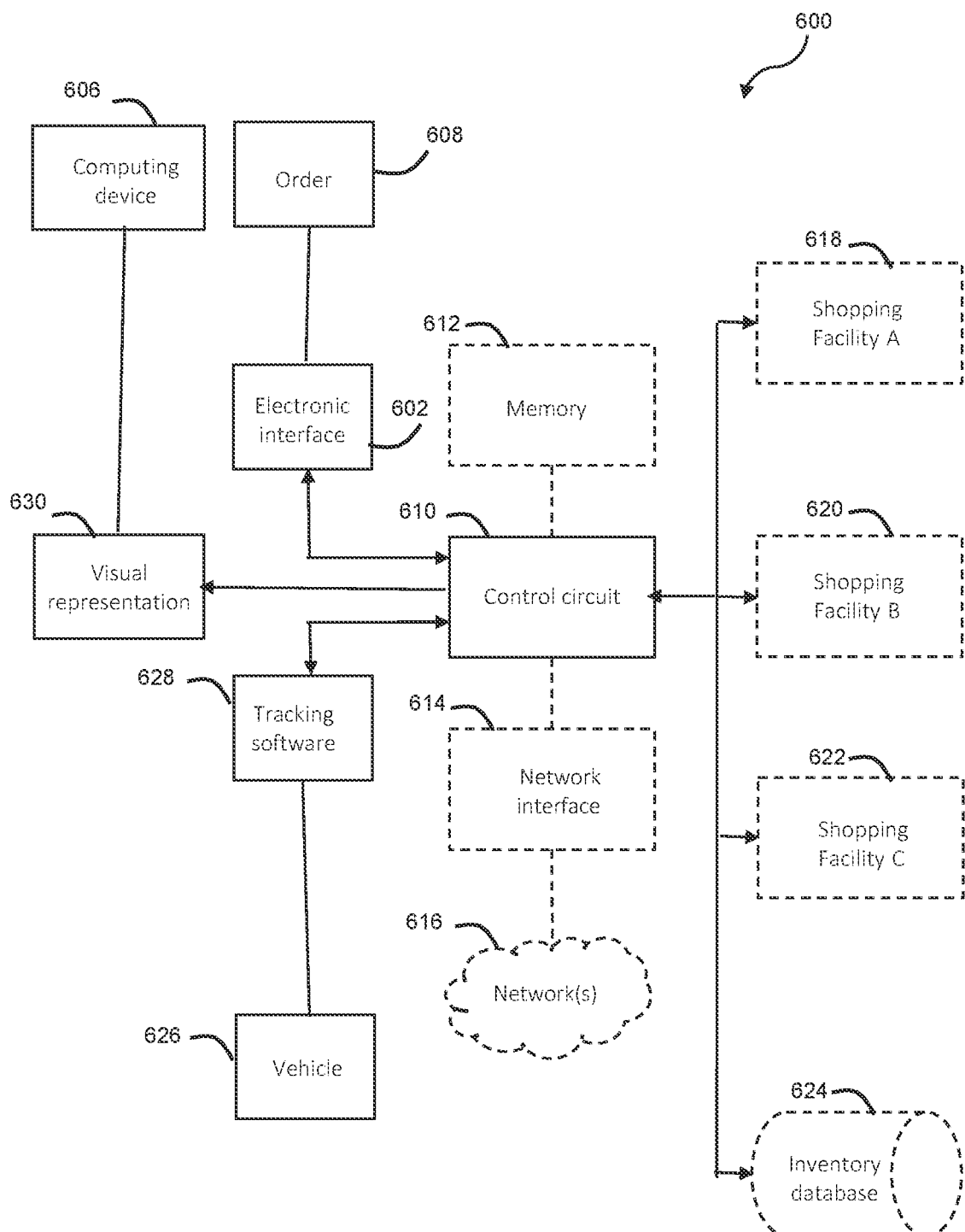
FIG. 6 is a block diagram in accordance with several embodiments.

FIG. 6 shows a system 600 for arranging for the pick up of an order at a shopping facility. The system 600 generally involves transmitting a visual representation 630 of the time of availability for pick up of the customer's order 608 at several nearby shopping facilities. The system 600 assists the customer in deciding which shopping facility to select for pick up. In one form, it is contemplated that it may provide a convenience to the customer by allowing the customer to see, at any time of the day, when and where products may be available for pick up from his current location. In effect, in one form, the map may "follow" the customer around and let the customer know where certain products are. Further, although the description in this disclosure generally addresses "products," it should also be understood that it may be applied to the availability of the provision of services.

Like systems 100 and 300 (which discussion is incorporated herein), the system 600 includes an electronic interface 602 that receives an order 604 corresponding to a customer. As described above, the order 604 may be directly submitted by a customer accessing a website or software application, and in one form, the electronic interface 602 may be in the form of a shopping server configured to serve as a platform for the input of the order information. Alternatively, the order 604 may be created internally based on an algorithm that considers the needs, past orders, and preferences of the customer. This approach may be used to create proposed orders (that may be predicted) on a recurring basis and that can then be accepted by the customer. In this form, an order may be generated and received at the electronic interface 602 (such as at some sort of computing platform). Accordingly, in various forms, the order may be a specific customer-inputted order, may be a predicted order, and/or may be items on a customer's shopping list. The customer may also specify what type of pick up is desired (in store, drive through, locker, etc.), or this information and other information may be part of customer preferences in a customer database.

In systems 100 and 300, times of availability for pick up of the order are determined. In system 100, the times of availability may be one or more time periods (or time windows) proposed by the customer that may be convenient to the customer. In system 300, the times of availability may be one or more time periods that are determined by access to the customer's electronic calendar. In system 600, in one form, it is contemplated that times of availability may have initially been determined under either of these approaches. However, in another form, the system 600 may be used to provide current times of availability simply in the course of a customer's daily activity. In system 600, it is generally contemplated that a visual representation 630 is provided to the customer showing times of availability for order pick at shopping facilities relative to other shopping facilities.

Like systems 100 and 300, the system 600 includes a control circuit 610 that generally controls operation of the system 600. The term "control circuit" generally has the same meaning and generally refers broadly to the type of control circuits 110 and 310 described above. As shown in FIG. 6, it may be coupled to a memory 612, a network interface 614, and network(s) 616. The general nature of control circuit 610, memory 612, network interface 614, and network(s) 616 was described above and is well understood in the art.

The control circuit 610 transmits a visual representation 630 of order availability at shopping facilities for display on a customer computing device. More specifically, the control circuit 610 is configured to: determine the location of the customer; determine shopping facility(ies) near the customer's location; determine time intervals when the order will be available for pick up at the shopping facility(ies) with each time interval corresponding to order availability if the customer instructs pick up of the order at that shopping facility; and transmits a visual representation indicating the time intervals of availability at the shopping facility(ies).

First, the control circuit 610 determines the customer location, and as addressed above with respect to systems 100 and 300, this determination may be made in several ways. In one form, the customer may input his or her location manually. In other words, the customer may input and transmit the customer's location to the control circuit 610. In another form, the customer location may be determined automatically by GPS or by other tracking software 628. In other words, the customer's location may be determined by tracking software 628 on a computing device 606 of the customer.

In one form, it is contemplated that the tracking software 628 may be used by the customer while the customer is traveling in his or her vehicle 626. In this context, it should be evident that the customer may use his or her computing device 606 (such as a smartphone or other mobile device) or a computing device 606 in the vehicle 626 to accomplish multiple purposes. The computing device 606 may include tracking software 628 for determining the customer's location and may also allow for display of the visual representation 630. The control circuit 610 may interact with one computing device 606 performing multiple functions.

Second, the control circuit 610 determines shopping facility(ies) near the customer's location. As addressed above, in one form, the control circuit 610 may determine all of the shopping facilities of a specific retailer that are within a certain maximum distance from the customer's location or within a certain maximum travel time from the customer's location (although the shopping facilities need not be limited to one retailer). The control circuit 610 may access a database identifying the store locations of the retailer in order to calculate which stores are within this maximum distance or travel time.

Third, the control circuit 610 determines time intervals when the order will be available for pick up at the shopping facility(ies). In determining these time intervals, the control circuit 610 may consider such factors as travel time from the customer location to each shopping facility and order preparation and assembly time. The order preparation and assembly time may be in the form of an estimate that may be governed by such factors as the size of the order and the nature of the products in the order. Alternatively, each shopping facility may be contacted individually to obtain an estimate of order preparation and assembly time. In one form, the control circuit 610 may use the later of the travel time and the order preparation and assembly time as the time interval when the order will be available for pick up. In other words, the control circuit 610 may be configured to: calculate the driving time to each shopping facility; determine the time for preparation of the order at each shopping facility; determine the time interval when the order will be available for pick up at each shopping facility based on the later of the driving time and time for order preparation at each shopping facility.

Fourth, the control circuit 610 transmits a visual representation 630 indicating the time intervals of availability at the shopping facility(ies). In one form, it is contemplated that the control circuit 610 may cause the display of the visual representation 630 on a computing device 606 of the customer. Further, the visual representation 630 may be displayed in a variety of ways. It may be color coded. In other words, the control circuit 610 may be configured to: select the time interval for each shopping facility from a group of time intervals; assign a specific color to each time interval in the group; and transmit the visual representation 630 to the customer with the time intervals shown by color coding. The visual representation 630 may also be shown by symbols and numeric values. In other words, the control circuit 610 may be configured to transmit the visual representation 630 with the time intervals represented as numeric values or as symbols selected from an assigned group of symbols. In one form, the numeric values may simply be the specific availability times. In addition, the visual representation 630 may be arranged so that the customer may activate (such as by touch, clicking on, voice activation, or otherwise) the color, symbol, numeric value, or other flag on his or her computing device 606 to access additional information, such as specific addresses of the shopping facilities, driving directions, and pick up options.

In another form, it is contemplated that partial orders may be shown by color or symbol in the visual representation 630. For example, a specific color (such as red) or a specific symbol (exclamation point) may be used to indicate the availability of a partial order, i.e., that only some of the products of the order are available at that shopping facility. In one form, the customer may click on (or otherwise access) the color, symbol, or other flag on his or her computing device 606 to determine how the order is incomplete. Further, a visual representation 630 may be updated to show the availability of a partial order. In one form, the control circuit 610 may be configured to: determine that one or more of the products of the order are not available at a shopping facility; update the order for that shopping facility to remove the unavailable one or more products; and transmit the visual representation 630 with a color or symbol indicating that the order has been updated for that shopping facility.

In one form, it is contemplated that the control circuit 610 may dynamically recalculate the availability times at the shopping facilities. For example, these availability times may be recalculated periodically (e.g., every five minutes), and the visual representation may be updated after each recalculation. In one form, the control circuit 610 may be configured to: recalculate the driving time to each shopping facility; re-determine the time for preparation of an order at each shopping facility; determine an updated visual representation indicating the time interval when the order will be available for pick up at each shopping facility based on the later of the recalculated driving time and re-determined time for order preparation; and transmit the updated visual representation to the customer. So, for example, if there is a change in driving time (i.e., a traffic accident or traffic congestion), the control circuit 610 may update the color coding, symbols, or numeric values in the visual representation 630.

It is generally contemplated that the visual representation 630 (or map) may change over time to provide customers with real time information. In one form, it is contemplated that as a customer performs his or her daily routine, the customer may access a software application with current information regarding when the order is available (such as in one hour, four hours, etc.) At any time, the customer may learn when and where products may be available.

It is also contemplated that the customer may be prompted to choose a specific shopping facility for pick up. In other words, the control circuit 610 may be configured to request that the customer select and transmit the shopping facility where the customer intends to pick up the order. Further, once the customer chooses a specific shopping facility, the control circuit 610 may calculate (such as through accessing navigational software) a driving route to the shopping facility for the customer. For example, in one form, the control circuit 610 may be configured to determine and transmit to the customer a route from the customer's location to the selected shopping facility using vehicle traffic and mapping software that selects the route based on real time traffic conditions and route information. In another form, the control circuit 610 may calculate routes to each of the shopping facilities shown in the visual representation 630.

In one form, the control circuit 610 may transmit instructions to the selected shopping facility (such as to a point of sale system at the selected shopping facility). In other words, the control circuit 610 may be configured to transmit instructions to the selected shopping facility to make the order available during the time interval corresponding to the selected shopping facility (such as, for example, Shopping Facility A (618)). It should be evident that it may be desirable to provide the selected shopping facility with early notice of the pick up so that the shopping facility may have sufficient time to prepare the order.

It is also contemplated that the control circuit 610 may determine if the shopping facilities have the products in inventory, and assuming selection of a shopping facility, this confirmation might occur before or after selection of the shopping facility. In one form, the system 600 may include an inventory database 624 (centralized or at each shopping facility) with inventory data for each shopping facility to determine if each shopping facility has the product(s) in the order. In FIG. 6, the control circuit 610 is shown in communication with Shopping Facility A (618), Shopping Facility B (620), and Shopping Facility C (622). Accordingly, this approach may involve communicating with servers and/or inventory databases at each shopping facility, such as to determine the inventory at each shopping facility (to confirm that all of the products are available). Alternatively, the control circuit 610 may involve communicating with an individual at each shopping facility to determine availability of the order 608.

Accordingly, in one form, the system 600 may relate to providing a customer (who has an order for products) with staged product pick up times and the locations of nearby stores for pick up. Initially, the customer may place an order on the system 600 for one or more products or an order may be otherwise generated. The system 600 may determine when these products will be available and at what nearby stores. The system 600 may provide a color coded map that shows when the products will be available (such as in 1 hour, 2 hours, 4 hours, etc.) and the store locations where the products can be picked up. The system 600 may also provide a route for traveling to the nearby stores and may provide driving directions. The system 600 may consider traffic data when making routing and duration calculations, and these traffic data may include delays on various roads and external information that may contribute to delays (such as car accidents). The system 600 may suggest an alternate store for pick up during travel if there is a status change in the availability of the product at the original store or a status change in the traffic data.

Figure 7:
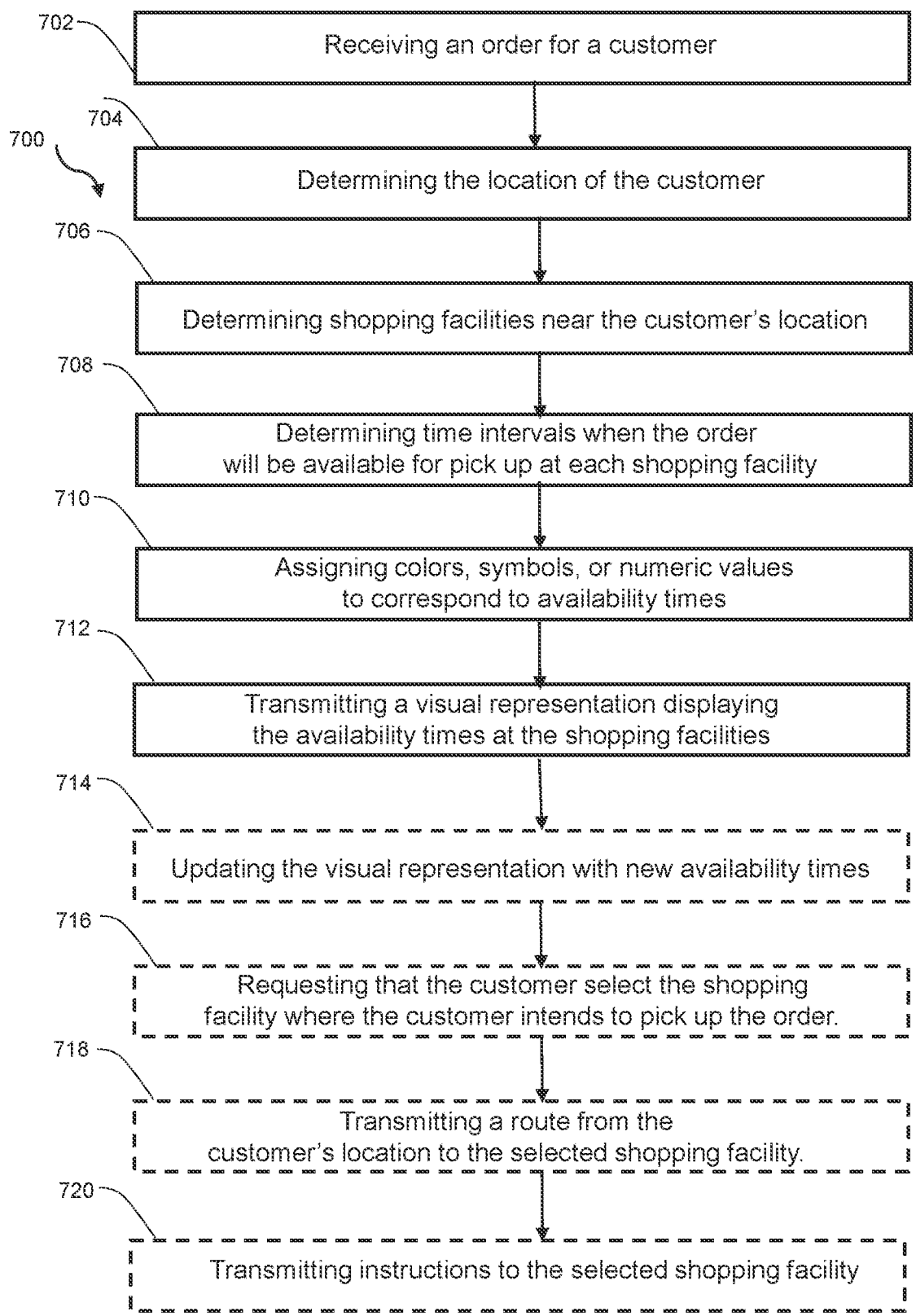
FIG. 7 is a flow diagram in accordance with several embodiments.

Referring to FIG. 7, a process 700 is shown for arranging pick up of requested products at shopping facilities using a visual representation. The process 700 may use some or all of the components from the system 600 described above. Generally, the process 700 determines the time of availability of a customer's order at nearby shopping facilities and transmits a visual representation of these times of availability to the customer.

At block 702, an order is received. As addressed previously, the order may be received in various ways. For example, the order may be directly placed by a customer and may be received at an electronic interface (such as via a website or software application), or the order may be created (such as via a centralized computing system) and transmitted to the customer for consideration. In one form, an order may be part of a recurring pattern of proposed orders based on the customer's purchase history, the elapsed time since the last purchase of certain merchandise, and/or customer preferences in a customer database.

At block 704, the location of the customer is determined (such as in ways addressed above). In one form, the location of the customer may be determined by requesting that the customer directly input the customer's location. In another form, the customer's location may be determined by tracking software (such as GPS or other tracking software).

At block 706, shopping facilities near the customer's location are determined. As addressed above, in one form, this determination may be based on a certain maximum distance or travel time from the customer's location. Alternatively, the customer location may be identified as being within a certain geographic region (such as of a neighborhood, city, or state), and the shopping facilities may be identified that are within that general geographic region.

At block 708, time intervals may be determined as to when the order will be available for pick up at each shopping facility. In one form, this determination may be made on the basis of travel time from the customer location to each shopping facility, order assembly and preparation time, etc. Travel time may be estimated using navigational software, such as route and mapping software that may take real time route and traffic conditions into account. Order assembly and preparation time may be estimated based on the size and general nature of the order, or it may be determined based on communication with and feedback from each of the shopping facilities.

At block 710, the assignment scheme for the visual representation is established. More specifically, there is an assignment of the specific colors, symbols, or numeric values or ranges corresponding to the times of availability at shopping facilities. For example, in a color coding scheme, the color green may be assigned to shopping facilities with orders available in an hour or more, the color yellow may be assigned to those with orders available in more than four hours, and the color orange may be assigned to those with orders available the next day. Further, as addressed above, this assignment scheme may also include partial orders (such as assigning the color red to a partial order).

At block 712, the visual representation is transmitted showing the coded availability times corresponding to the shopping facilities. Further, in one form, it is contemplated that the process 700 may dynamically recalculate the availability times at the shopping facilities. In other words, as shown at block 714, these availability times may be recalculated periodically (e.g., every five minutes), and the visual representation may be updated after each recalculation with new availability times. Although this updating step 714 is shown before steps 716-720, it should be understood that this updating step 714 may be a continual step that may be performed before, about the same time as, or after these other steps.

At block 716, the customer may be requested to select the shopping facility where the customer intends to pick up the order. Further, if the customer chooses a specific shopping facility, a driving route may be calculated (such as via navigational software) from the customer's location to the shopping facility and may be transmitted to the customer, as shown at block 718. Additionally, the routes to the other shopping facilities shown in the visual representation may also be calculated and transmitted to the customer.

At block 720, instructions may be transmitted to the selected shopping facility. In other words, instructions may be transmitted to the selected shopping facility to make the order available during the time interval corresponding to the selected shopping facility. In one form, it is also contemplated that a determination will be made if the selected shopping facility and possibly other shopping facilities have the products in inventory. It is contemplated that this determination may occur at any of various steps of the process 700. For example, the determination could occur relatively early in the process 700 (such as in conjunction with step 708 when availability times of shopping facilities are being determined) or relatively late in the process (such as in conjunction with step 720 as a confirmation that the products in the order are available at the selected shopping facility). Alternatively, an optional step may be to initially screen the customer's order for certain types of specialty items or known merchandise items that may not be frequently stocked at many shopping facilities.

Figure 8:
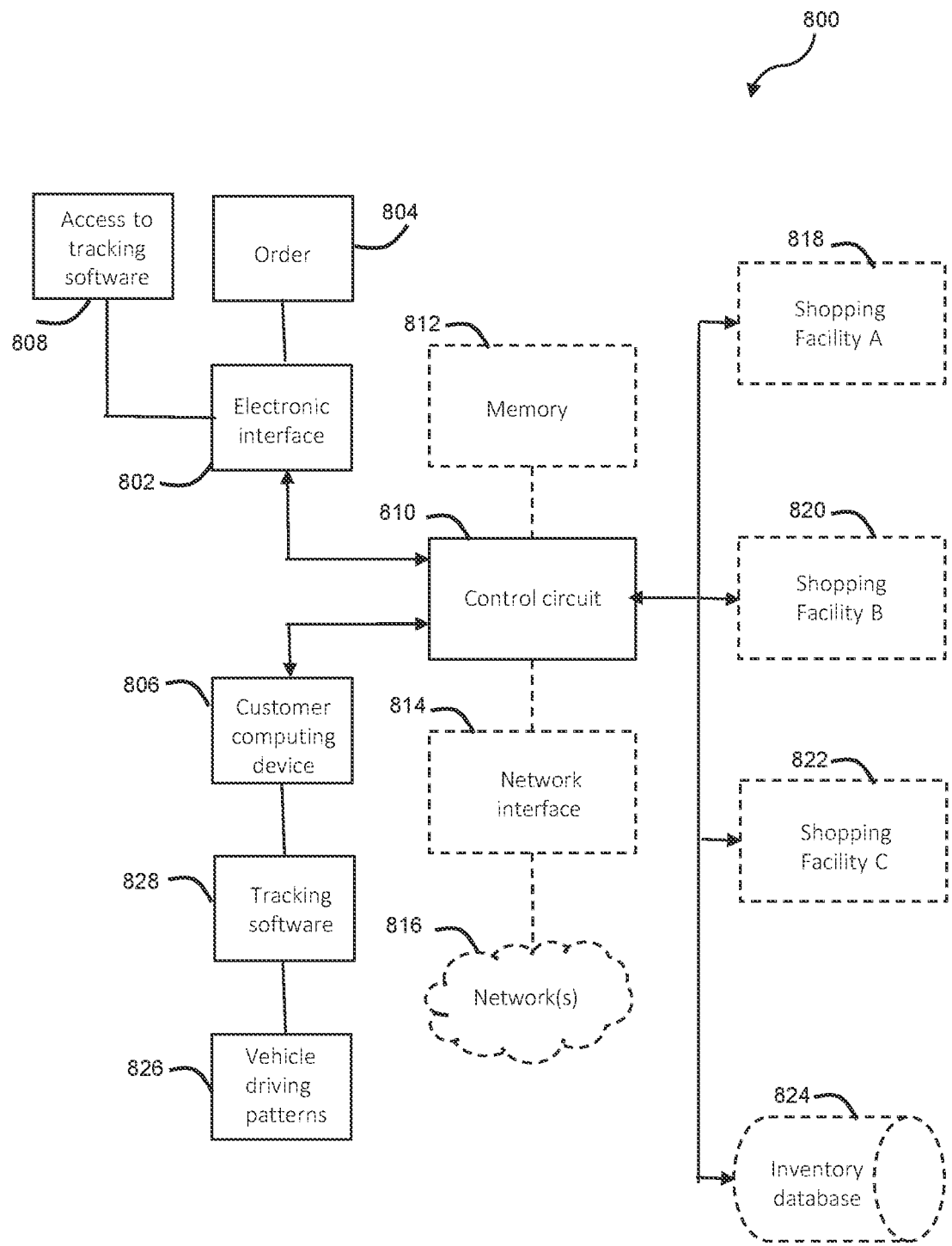
FIG. 8 is a block diagram in accordance with several embodiments.

Now, referring to FIG. 8, there is shown a system 800 for arranging for the pick up of an order at a shopping facility based on a customer's driving patterns. The system 800 generally involves the use of tracking software to determine a customer's driving patterns over time. These driving patterns can then be used generally to make predictions as to the customer's location at certain times during the week. The system 800 may then propose the convenient pick up of the order when the customer is likely to be near a shopping facility along a driving route. In one form, the system 800 may map shopping facility locations that are closest to the customer's "daily route."

Like systems 100, 300, and 600 (which discussion is incorporated herein), the system 800 includes an electronic interface 802 that receives an order 804 corresponding to a customer. As described above, the order 804 may arise in several different ways. The order 604 may be inputted by a customer accessing a website or software application, and in one form, the electronic interface 802 may be a server arranged to serve as a platform for inputting of the order 804. In another form, the order 804 may be in the form of a suggested order 804 to the customer and such orders 804 may be generated on a recurring basis. Further, these orders 804 may be created based on various factors, including, without limitation, the timing and nature of past orders and the preferences of the customer (as may be stored in a customer database). In this form, a proposed order may be internally generated and received at the electronic interface 802 and transmitted to the customer for consideration. In other words, a control circuit 810 (described below) may be configured to: determine a proposed order that may be desired by the customer; transmit the proposed order to the customer; and receive a confirmation from the customer indicating placing the order.

In system 800, it is contemplated that the customer's driving patterns will be determined by tracking software (such as GPS tracking software). In one form, a customer may provide permission to access tracking software 808 on the customer's computing device 806. For example, the customer may provide permission via a website or software application, and this permission may be stored as a preference in a customer database.

Like systems 100, 300, and 600, the system 800 includes a control circuit 810 that is generally coupled to other components of the system 800. The term "control circuit" generally has the same meaning and generally refers broadly to the type of control circuits 110, 310, and 610 described above. As shown in FIG. 8, it may be coupled to a memory 812, a network interface 814, and network(s) 816. The general nature of control circuit 810, memory 812, network interface 814, and network(s) 816 was described above and is well understood in the art.

The control circuit 810 transmits an invitation to pick up an order 804 at a shopping facility based on the customer's driving patterns. More specifically, the control circuit 810 is configured to: access the tracking software 828 on the customer's computing device 806; determine driving patterns 826 of the customer based on movement of the computing device 806 along driving routes within a certain time period; determine a shopping facility within a certain proximity to a location along a driving route; transmit an invitation to the customer to pick up the order 804 at that shopping facility; and receive an acceptance to the invitation indicating selection of that shopping facility.

Initially, it is contemplated that the computing device 806 with tracking software 828 will be in a vehicle for a certain period of time ("initialization period") so as to establish the customer's driving patterns 826 prior to an invitation to pick up an order 804. During this initial time period, driving patterns 826 may be monitored and fed into a database. During this initialization period, the control circuit 810 may determine days of the week with reliable and consistent driving patterns 826 (such as commutes to and from work between Monday and Friday). In other words, in one form, the control circuit 810 may be configured to: determine a plurality of driving patterns 826 corresponding to a specific day of the week for a number of weeks; compare the driving patterns 826 for that specific day of the week; and determine if the driving pattern 826 for that specific day for one week matches the driving patterns for that specific day for other weeks. In this manner, the control circuit 810 may determine a certain degree of the "predictability" of the driving patterns (i.e., there is a 90% degree of confidence that the customer will be at or within a short distance of a specific location every Tuesday at 5:00 pm because that is along the customer's ordinary commute home from work). A degree of confidence may be associated with each (or many) of the locations and corresponding times of the driving patterns 826.

Further, it is contemplated that, following this initialization period, these driving patterns 826 may be continually updated. In other words, the control circuit 810 may be configured to: store the locations and corresponding times of day of the driving patterns 826 in a database; re-access the tracking software 828 on the customer's computing device 826; re-determine the customer's driving patterns 826 including the locations and corresponding times of day of the customer's computing device 826 along the driving routes; and update the locations and corresponding times of day in the database at periodic time intervals. Thus, the driving patterns 826 may be updated with new driving data (such as might show a change in the customer's employment location or a change in the commuting route taken to and from work). A database may be iteratively updated based on continued driving patterns.

In one form, the control circuit 810 may transmit a suggested pick up time window to customer. In other words, the control circuit 810 may be configured to transmit the invitation with a suggested pick up time window corresponding to a time of day where the computing device is within a certain maximum distance of a shopping facility. For example, the invitation may be sent to suggest a pick up window at or after 5:00 pm (during the customer's ordinary commute home from work) when the customer is less than the maximum five miles from a shopping facility. The suggested time window may take into account additional factors, such as the anticipated travel time from the driving route to the shopping facility, the anticipated traffic conditions, and/or estimated order assembly and preparation time. Alternatively, the control circuit 810 need not transmit a suggested pick up time window at all but instead may make a prediction of the customer's arrival for pick up based on the driving patterns.

Further, in one form, the invitation may be transmitted to the customer before the start of a driving route. The invitation may be sent early in the day (such as, for example, at 9:00 am) so that the customer has sufficient time to consider and plan the day's schedule. In other words, the control circuit 810 may be configured to: determine the customer's time of initiation of a driving route; and transmit the invitation to the customer a certain minimum amount of time prior to the customer's initiation of the driving route. In one form, the control circuit 810 may make recommendations of possible pick up locations throughout the day at different points along the customer's route.

In addition, in one form, the customer may be invited to pick up an order 804 at different shopping facilities at different times. For example, the customer may be within a certain maximum distance of several different shopping facilities at different times of a day (or the same shopping facility at different times of the day). The customer may be sent an invitation (such as early in the day) to select one of the times and locations for pick up, and, in one form, the locations of the possible shopping facilities may be displayed on a map. In other words, the control circuit 810 may be configured to: determine multiple shopping facilities within a certain distance to locations along the driving routes; transmit the invitation to the customer to pick up the order at one of the shopping facilities; and receive a response to the invitation indicating the customer's selection of a specific shopping facility for pick up of the order.

In one form, following acceptance of an invitation for pick, a driving route to the selected shopping facility may be calculated for the customer. This calculation may be accomplished using navigational software. In one form, the control circuit 810 may be configured to determine and transmit to the customer a route from the customer's location to the selected shopping facility using vehicle traffic and mapping software that selects the route based on real time traffic conditions and route information.

Also, in one form, following selection by the customer, an instruction or confirmation may be sent to the selected shopping facility. In other words, the control circuit 810 may be configured to transmit instructions to the selected shopping facility to make the order 804 available during the suggested pick up time window. In one form, the invitation may include an acceptance time by which the customer must select a shopping facility so that the order 804 is ready for pick up during the suggested pick up time window. Alternatively, in another form, preparation of the order may be initiated when the invitation is sent out or at some certain time prior to the suggested pick up time window.

It is also contemplated that the control circuit 810 may determine that the shopping facilities along the driving routes have the ordered products available. This determination may be accomplished in the various ways described previously in this disclosure. As described, the system 800 may include an inventory database 824 (centralized or at each shopping facility) with inventory data for each shopping facility, or the control circuit 810 may be in communication with shopping facilities along the driving routes—Shopping Facility A (818), Shopping Facility B (820), and Shopping Facility C (822). This determination might occur before or after sending of the invitation to pick up the order 804.

Accordingly, in one form, the system 800 may provide convenient product pick up locations for a customer based on the customer's daily driving patterns 826. The customer may provide his daily driving patterns 826 to the system 800, such as by allowing ("opting into") the system 800 to track these patterns (such as, for example, by GPS tracking of the customer's car). When the customer places an order 804 with a retailer, the system 800 may look at the customer's daily driving patterns 826 and may then map the store locations with inventory/products that are closest to the customer's daily route. The system 800 may map convenient store locations and may also suggest a time for pick up based on the customer's daily driving patterns 826. The customer may then select a store location for pick up of the products, and the system 800 may provide driving directions. The system 800 also may use the customer's daily driving patterns 826 to predict the customer's likely pick up time, which the system 800 may use to initiate preparation of the order 804.

Figure 9:
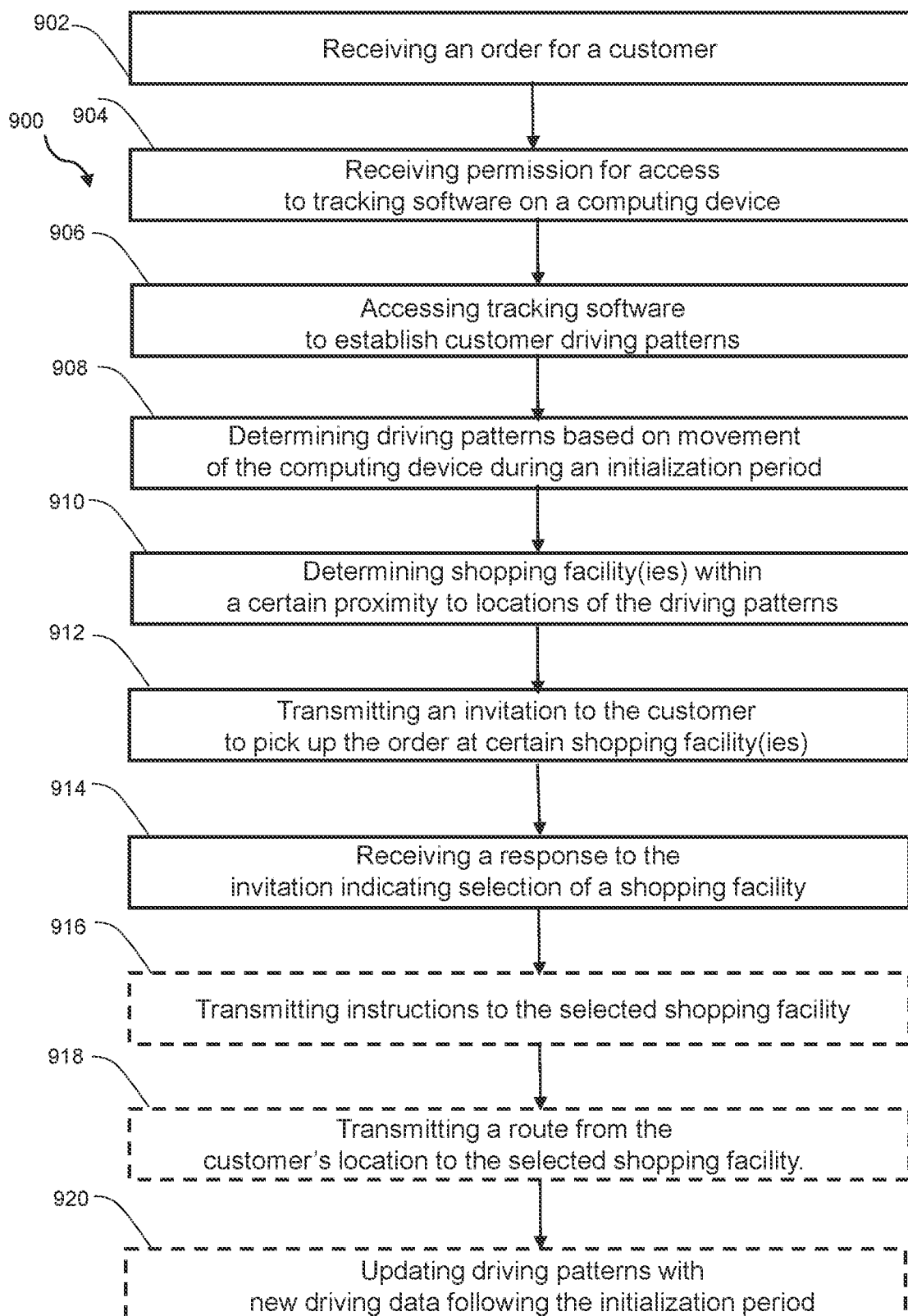
FIG. 9 is a flow diagram in accordance with several embodiments.

FIG. 9 shows a process 900 involving the pick up of an order at a shopping facility based on a customer's driving patterns. The process 900 may utilize some or all of the components from the system 800 described above. Initially, the process 900 determines the driving patterns of the customer using tracking software from a computing device. Then, it makes suggestions for the pick up of an order at one or more shopping facilities predicted to be located close to a driving route of the customer.

At block 902, an order is received. In one form, the order may be inputted by a customer and may be received at an electronic interface (such as via a website or software application). In another form, the order may be created (such as via a centralized computing system) and transmitted to the customer for consideration. For example, a proposed order that may be desired by the customer may be determined; it may then be transmitted to the customer; and confirmation from the customer may be received indicating placement or acceptance of the proposed order.

At block 904, permission for access to tracking software on a computing device is received. In one form, a customer may provide access via a website or software application when the customer is making an initial order. This permission may be stored as a preference in a database and may also indicate the customer's desire to received invitations to pick up orders along the customer's driving routes.

At block 906, the tracking software is accessed to establish the customer's driving patterns. In one form, it is contemplated that time and location data indicating movement of the computing device may be collected during an initialization period to establish the driving routine of the customer. As shown at block 908, once a sufficient amount of data has been collected, the driving patterns of the customer may be determined. In one form, it is contemplated that estimated time and location values may be established that may constitute some form of weighted average of the collected data. Further, a certain probability value may be associated with each time and location value as an indicator of how frequently the customer was at or near a certain location at a certain time. For example, as mentioned above, there may be a probability value (or confidence degree or level) of 90% that the customer will be at or within a short distance of a specific location every Tuesday at 5:00 pm because that location is along the customer's ordinary commute home from work.

At block 910, shopping facilities are determined within a certain proximity to locations along the customer's driving routes. In one form, shopping facilities may be determined that are within a certain maximum distance of the locations. Alternatively, shopping facilities within the neighborhood or city corresponding to the driving route location may be chosen. In addition, in making this determination, additional factors may be taken into account, such as travel times from the locations to the shopping facilities and/or traffic conditions.

At block 912, an invitation is transmitted to the customer to pick up the order at certain shopping facility(ies). The invitation may (but need not) include estimated pick up times. In one form, the invitation may include only one proposed shopping facility and one proposed time to provide greater control and use fewer resources. In another form the invitation may include different shopping facilities and different pick up times (or the same shopping facility and different pick up times). For example, an invitation may be sent out early Tuesday morning providing the following pick up options on Tuesday: (a) Shopping Facility A at 8:30 am (along the customer's commute from home to work); (b) Shopping Facility B at 5:15 pm (at a first location along the customer's commute from work to home); and (c) Shopping Facility C at 5:45 pm (at a second location along the customer's commute from work to home). In one form, these shopping facility options may be displayed on a map.

At block 914, a response to the invitation is received indicating the selection of a specific shopping facility. For example, the customer might select option (b) above—Shopping Facility B at 5:15 pm. As should be evident, the customer might also reject all of these options or might not provide a response.

At block 916, instructions may be transmitted to the selected shopping facility. In other words, instructions may be transmitted to the selected shopping facility to make the order available during the suggested pick up time window. In the example, Shopping Facility B may be instructed to prepare the order for pick up at or around 5:15 pm. At block 918, a driving route may be calculated (such as via navigational software) to the selected shopping facility (Shopping Facility B) and may be transmitted to the customer.

In one form, it is also contemplated that a determination may be made if the selected shopping facility and possibly other shopping facilities have the products in inventory. It is contemplated that this determination may occur at any of various steps of the process 900. For example, the determination could occur at or before step 912 (when the invitation is being transmitted to the customer) or at step 916 (after the customer has selected a specific shopping facility for pick up). Alternatively, an additional optional step may be to initially screen the customer's order for certain types of specialty items or known merchandise items that may not be frequently stocked at many shopping facilities.

At block 920, the process 900 may update driving patterns with new driving data following the initialization period. In one form, it is generally contemplated that there will be a continual updating of driving patterns to make use of current information. An invitation to pick up an order at a certain shopping facility at a certain time may have little value if the customer's circumstances have changed (e.g., change of employment location or change of driving route to and from work) and if the driving patterns from the initialization period have become outdated.

Figure 10:
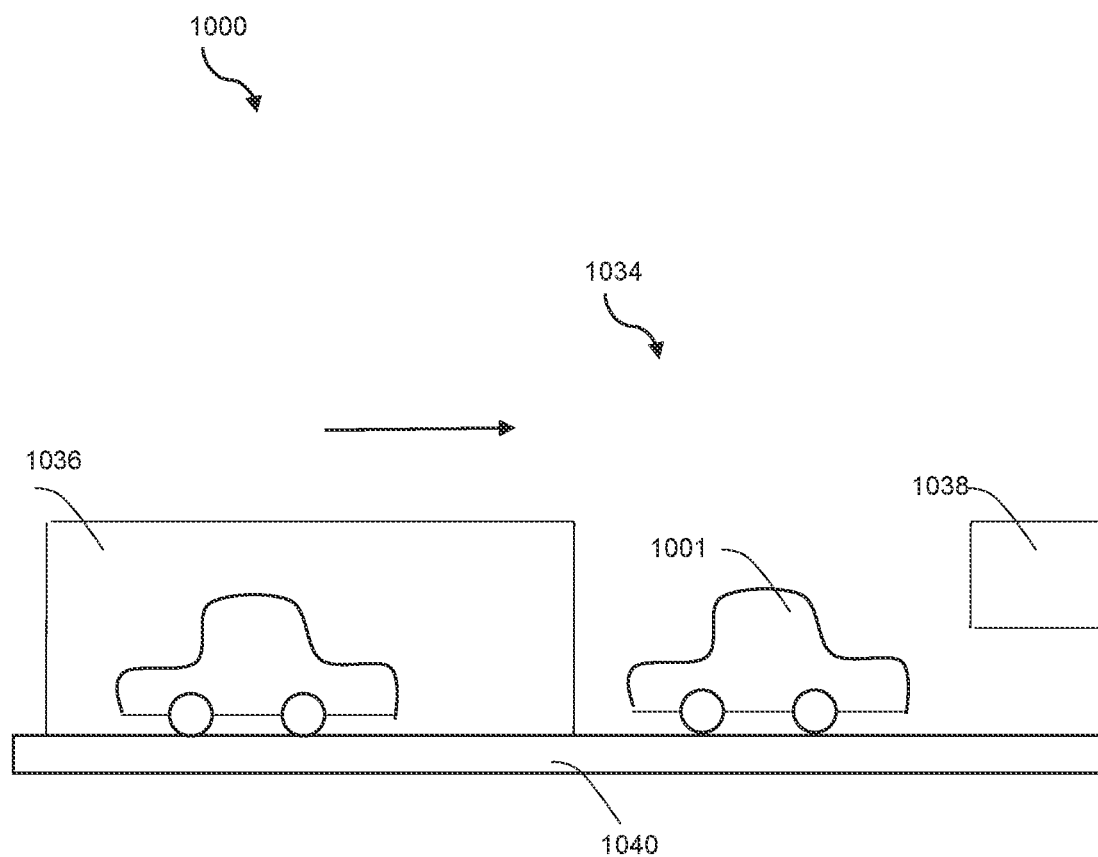
FIG. 10 is a schematic diagram in accordance with several embodiments.

Referring now to FIG. 10, there is shown a schematic diagram of a portion of a system 1000 for order pick up incorporating washing the customer's vehicle 1001. FIG. 10 shows the automated vehicle wash apparatus 1036 operatively coupled to a conveyor assembly 1040, which is, in turn, operatively coupled to a product pick up location 1038. It is generally contemplated that the automated vehicle wash apparatus 1036 (followed by pick up of the order) can provide additional value to the customer and can occupy some of the order completion time. The length of time for completion of the automated vehicle wash is known, so the timing of delivery of the order to the customer can be coordinated with completion of the vehicle wash via the conveyor assembly 1004.

Figure 11:
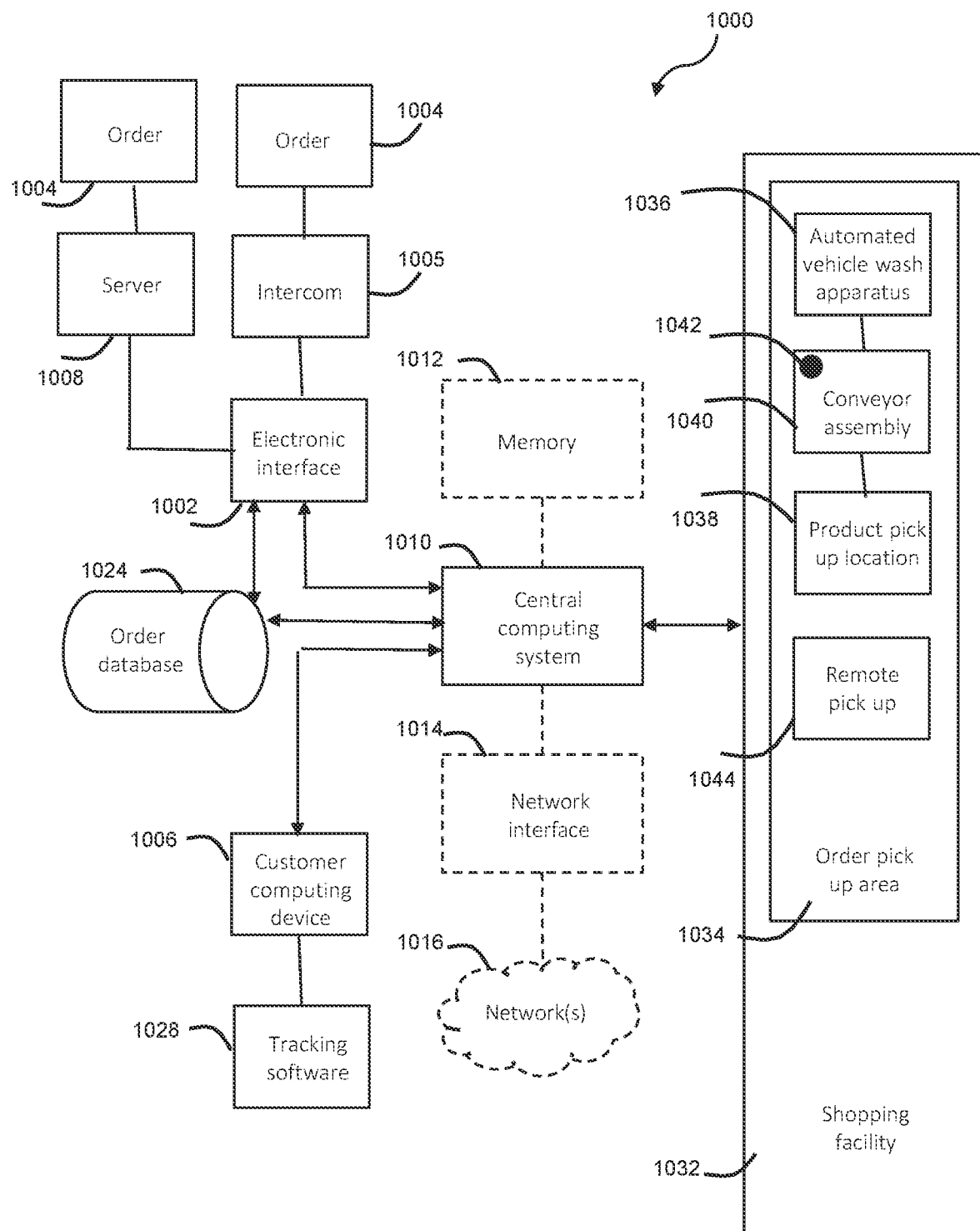
FIG. 11 is a block diagram in accordance with several embodiments.

FIG. 11 shows the system 1000, which includes an electronic interface 1002 (like the ones described above in systems 100, 300, 600, and 800). The electronic interface 1002 may receive an order 1004 in various ways. The order 1004 may be sent by a customer accessing a website or software application to an electronic interface 1002 in the form of a server 1006 arranged to serve as a platform for receiving the order 1004. In another form, the order 1004 may be in the form of an order 1004 proposed to the customer based such factors as, without limitation, the timing and nature of past orders and customer preferences. In one form, a pick up time may be pre-arranged with the customer. In other words, the electronic interface 1002 may be configured to receive information from the customer or communicate information to the customer regarding a time of availability for pick up of the order at the shopping facility 1032. In yet another form, it is contemplated that the order may not be generated in advance but instead may be placed by the customer at the shopping facility 1032. In this circumstance, the electronic interface 1002 may be in the form of an intercom 1005 for drive-up orders. In system 1000, it is generally contemplated, without limitation that the pick up of orders 1004 will be in the general form of a drive-thru delivery (although the customer might also pick up the order from a cashier or locker at or in the shopping facility 1032).

In system 1000, it is contemplated that the customer's arrival may be determined in several ways. In one form, the customer's arrival may be determined by activation of the intercom 1005. In another form, it is contemplated that the customer may have a computing device 1006 with tracking software 1028 (such as GPS tracking software). For example, the system 1000 may be used in conjunction with systems 100, 300, 600, and 800 described above, in which permission may have been received to access tracking software 1028. The shopping facility 1032 may have been selected and notified that the customer intends to pick up the order 1004 (possibly within a certain time window), and the tracking software 1028 may be used to indicate the customer's approach or arrival at the shopping facility.

In one form, a geo-fence may be used to set up a trigger such that when the customer's computing device 1006 enters the area surrounding the shopping facility, an alert or notification is sent to the shopping facility. Sensors may be arranged to establish this geo-fence detecting the customer's arrival. This arrival information may be used to instruct assembly of the customer's order 1004 or may be used as an indicator of the estimated time remaining to complete assembly of the customer's order.

Further, the system 1000 generally includes the shopping facility 1032 where the order 1004 is made available for pick up by a customer arriving in a vehicle 1001. As shown in FIGS. 10 and 11, it is generally contemplated that the shopping facility 1032 will include an order pick up area 1034 having a certain physical arrangement. The order pick up area 1034 has an automated vehicle wash apparatus 1036 that can wash the vehicle 1001 in a certain known amount of time. The automated vehicle wash apparatus 1036 may be in a covered area that is controlled for environment and safety. The order pick up area 1034 also has a product pick up location 1038 for delivering the order 1004 from the shopping facility 1032 to the customer. A conveyor assembly 1040 is operatively coupled to both the automated vehicle wash apparatus 1036 and the product pick up location 1038 such that the automated vehicle wash apparatus 1036 generally precedes the product pick up location 1038 in a normal direction of travel of the conveyor assembly 1040. In other words, the customer's vehicle 1001 generally goes through the automated vehicle wash apparatus 1036 before arriving at the product pick up location 1038.

The system 1000 also includes a central computing system 1110 that is communicatively coupled to the electronic interface 1002 and certain portions of the shopping facility 1032 (including the conveyor assembly 1040 and preferably the automated vehicle wash apparatus 1036). As described herein, the language "central computing system" refers broadly to any microcontroller, computer, or processor-based system or device with processor, memory, and programmable input/output peripherals, which is generally designed to govern the operation of other components and devices. It is further understood to include common accompanying accessory devices, including memory, transceivers for communication with other components and devices, etc. As shown in FIG. 11, central computing system 1010 may be coupled to a memory 1012, a network interface 1014, and network(s) 1016. These architectural options are well known, were described at least to some extent above (which discussion is incorporated herein), are understood in the art, and require no further description here.

The central computing system 1010 coordinates the operation of the automated vehicle wash apparatus 1036 with delivery of the order 1004 to the customer. In other words, the central computing system 1010 is configured to: determine the arrival of the customer in the vehicle 1001 at the order pick up area 1034; instruct assembly and fulfillment of the order 1004; and coordinate delivery of the order 1004 in the order pick up area 1034 with completion of the vehicle wash. As described above, in some forms, the arrival of the customer may be determined by intercom 1005 or by geo-fence communicatively coupled to the central computing system 1010.

The central computing system 1010 may be communicatively coupled to an order database 1024 that may store orders 1004. The central computing system 1010 may access the order database 1024 when a customer arrives at the shopping facility 1032 to pick up an order 1004. In other words, the order database 1024 may be communicatively coupled to the electronic interface 1032 and contain information regarding the order 1004 and the ordering customer, and the central computing system 1010 may be configured to access the order database 1024 and determine the order corresponding to an arriving customer.

In one form, the automated vehicle wash apparatus 1036 may include multiple vehicle wash options that may affect the available time for preparation and assembly of the order 1004. The central computing system 1010 may be configured to allow the customer to select the length of time of the automated vehicle wash apparatus 1036 from one of a group of options. These options may correspond to various automatic vehicle wash involving cleaning, rinsing, washing, waxing, and polishing of the vehicle 1001. The specific option selected by the customer (and the corresponding length of time of vehicle wash with that option) may be used in calculating the available time for preparation and assembly of the order 1004 so that the order 1004 can be delivered at the product pick up location 1038. In one form, the vehicle wash may be made available to a customer where an amount exceeds a minimum monetary amount (such as, for example, purchases exceeding a certain amount per visit or a certain amount per month or other time period).

The system 1000 may also include a communication interface 1042 that allows communication with the customer during a vehicle wash. In other words, the system 1000 may include a communication interface 1042 that moves with the conveyor assembly 1040 in the automated vehicle wash apparatus 1036 to allow the customer in the vehicle 1001 to communicate with the shopping facility 1032. The central computing system 1010 may communicate with the customer through the communication interface 1042 to communicate, for example, the following information: the estimated time of completion of the order, alternative purchase suggestions, and information about new products.

In one form, the vehicle wash time may be adjusted so that order 1004 is ready upon completion of the vehicle wash. For example, the central computing system 1010 may be configured to: start an order assembly clock (or timer) when the customer's vehicle arrives at the shopping facility 1032; calculate a time interval for assembly of the order 1004 and for delivery to the customer at the product pick up location 1038; and adjust and synchronize the timing and speed of the automated vehicle wash apparatus 1036 so that the vehicle 1001 arrives at the product pick up location 1038 at or after assembly of the order 1004. In other words, the central computing system 1010 may adjust the length and nature of the vehicle wash so that the delivery is ready at the product pick up location 1038 when the vehicle wash is completed. In one form, the central computing system 1010 may adjust and synchronize the timing and speed of the automated vehicle wash apparatus 1036 by selecting one of various vehicle wash options that provide sufficient time for preparation and assembly of the order 1004.

It is generally contemplated that the order 1004 will be provided to the customer at the product pick up location 1038. However, it may be desirable to provide for delivery at a remote location in the order pick up area 1034 if the order cannot be delivered immediately upon completion of the vehicle wash. In one form, the central computing system 1010 may be configured to: if the order 1004 is assembled within the operating time of the automated vehicle wash apparatus 1036, instruct delivery of the order 1004 at the product pick up location 1038; but if the order is not assembled within the operating time of the automated vehicle wash apparatus 1038, instruct delivery of the order 1004 at a remote location 1044 in the order pick up area 1034 other than the product pick up location 1038. The products of the order 1004 may be loaded in the vehicle 1001 at this remote location 1044 by employees of the shopping facility 1032. As is evident, this approach may seek to avoid delay to later-arriving customers.

Accordingly, in one form, the system 1000 may relate to a car wash for a customer who has placed an order for products for pick up at a store of a retailer. The customer may have placed the order 1004 in various ways and may have been instructed to pick up the order 1004 at a store near the customer within a certain time window. Alternatively, the customer may have arrived unannounced to pick up the order 1004. Optionally, when the customer arrives at the store, if the order is above a predetermined monetary amount or if the customer has made total purchases above a certain monetary amount for the month, the customer receives a car wash of his vehicle. The system 1000 includes a pick up location design that includes a "conveyor belt" assembly line 1040 like an automated car wash. More specifically, the system 1000 includes a car wash conveyor 1040 for the vehicle 1001 that may be used in conjunction with a product pick up window 1038. The "conveyor belt" assembly line 1040 may be a covered area that is controlled for environment and safety. The duration of the car wash may be tailored to the average duration of order fulfillment.

This approach provides a number of additional advantages and options. Many customers would not feel like they are waiting for completion of their orders 1004. In one form, the sequence of customers entering, exiting (or who have exited), or in the vehicle wash may be tracked by Bluetooth picking up the GPS on a computing device (such as a smartphone). This Bluetooth tracking may assist in determining customer location for customers who have moved to remote locations 1044. Further, the use of the vehicle provides a more even, metered flow to the order pick up and may provide more time to employees handling order assembly. In one form, the vehicle wash may itself be considered as a sort of geo-fence because the run time of the conveyor assembly 1040 is known and this run time gives the system 1000 a defined amount of time to complete the order 1004.

Figure 12:
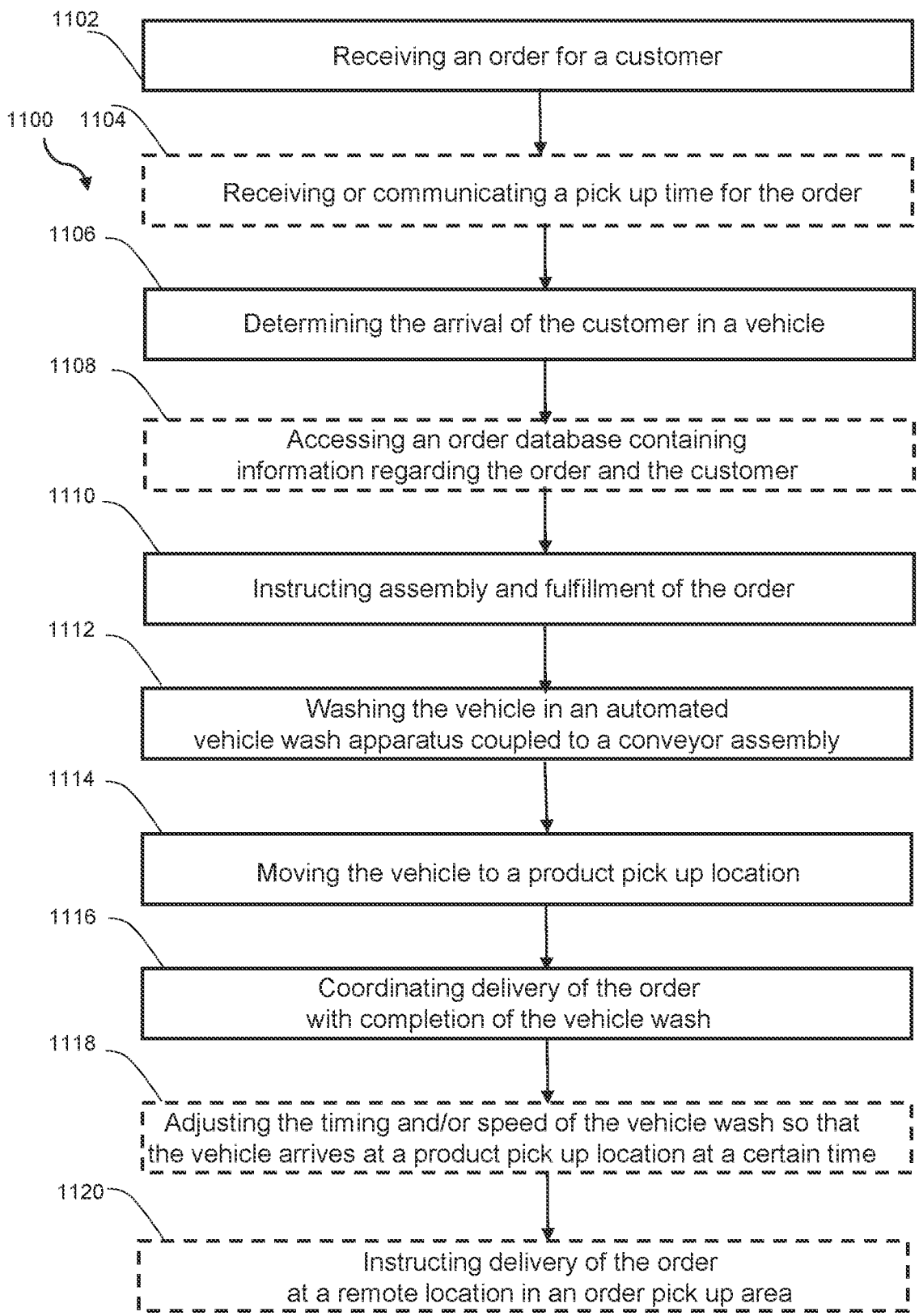
FIG. 12 is a flow diagram in accordance with several embodiments.

FIG. 12 shows a process 1100 for coordinating timely order delivery at a shopping facility together with an automated vehicle wash. The process 1100 may use some or all of the components described in system 1000 above. The process 1100 contemplates the use of a conveyor assembly coupled to both an automated vehicle wash apparatus and a product pick up locations. The process 110 coordinates the length of the automated vehicle wash with the time required for preparation of the order. It is contemplated that the automated vehicle wash provides some value to the customer and may occupy the customer's time while he or she is waiting for the order.

At block 1102, an order for a customer is received. In some forms, the order may be received prior to the customer's arrival at the shopping facility. For example, the order may be directly submitted or inputted by a customer, or it may be generated by a shopping facility or retailer and communicated to the customer for acceptance. In another form, the order may not be received prior to the customer's arrival at the shopping facility. For example, the order may be submitted via intercom prior to entry into an automated vehicle wash apparatus.

At block 1104, a pick up time may be received or communicated to the customer. This step is contemplated generally for orders that were received prior to the customer's arrival at the shopping facility. In other words, the customer or a central computing system may schedule a time or time window for pick up of the order at the shopping facility, such as in accordance with systems and processes described earlier in this disclosure.

At block 1106, the arrival of the customer in a vehicle is determined. In one form, this arrival may be communicated directly by the customer, such as via an intercom. In another form, it is contemplated that the shopping facility may have some sort of a geo-fence that recognizes the arrival or approach of tracking software in a computing device of the customer and that transmits a notification or message to a central computing system.

At block 1108, an order database may be access containing example regarding the order and the customer. For example, the customer may have placed an order prior to arrival at the shopping facility, and information regarding this order may have been stored in the order database. Upon the customer's arrival at the shopping facility, he or she may provide some identifying information (such as a customer name or identification number) that can be used to access the order information (such as the contents of the order) on the order database.

At block 1110, assembly and fulfillment of the order is instructed. It should be understood that this step may occur at various different points in the process 1100. For example, if the order was received prior to the customer's arrival, this instruction step may occur at any time after receipt of the order (block 1102). It may have occurred immediate after receipt of the order. In addition, assembly and fulfillment may have been initiated at one time, and later or final instructions may have been provided at a later time. Further, if there is a suggested time or time window for pick up, assembly of the order may have been initiated at a certain minimum time prior to the customer's expected arrival. Alternatively, the order may not have been received prior to the customer's arrival at the shopping facility. In this instance, assembly of the order would not have occurred or been initiated before that arrival time.

At block 1112, the customer's vehicle is washed in an automated vehicle wash apparatus coupled to a conveyor assembly. As described above, the duration of the vehicle wash is known and may be used in conjunction with assembly of the order (either in estimating the time required for completion of assembly of the order or in adjusting the duration of the vehicle wash to coincide with completing assembly of the order). The automated vehicle wash apparatus may include a variety of different cleaning options that may increase the duration of the vehicle wash. In one form, fulfillment of the order 1004 may be tied into vehicle wash duration. For example, it may be intended that fulfillment generally be accomplished within the standard vehicle wash run time (such as five minutes). Additionally, a geo-fence trigger (such as notification based on GPS detection of arrival of customer) may provide ten minutes for order fulfillment, or the vehicle wash duration may be increased (such as by the addition of vehicle wash options that might increase the duration to a seven minute run time).

At block 1114, after completion of the vehicle wash, the vehicle is moved to a product pick up location by the conveyor assembly. It is contemplated that the order will generally be delivered to the customer at this product pick up location. At block 1116, delivery of the order is coordinated with completion of the vehicle wash. In one circumstance, such as where there is a scheduled pick up, the order may have been ready for delivery prior to the customer's arrival at the shopping facility. In this circumstance, the order may be ready for pick up following completion of the vehicle wash without any additional action. However, in other circumstances, some assembly/fulfillment activity may be still required, and the duration of the vehicle wash provides some additional time for completion of such activity.

Optionally, as shown at block 1118, the timing and/or speed of the vehicle wash may be adjusted so that the vehicle arrives at the product pick up location at a certain time. In other words, in one form, the duration of the vehicle wash may be increased (such as by providing additional cleaning options) so as to provide additional time for completing assembly/fulfillment of the order. Further, optionally, as shown at block 1120, if it is determined that the order cannot be assembled upon completion of the vehicle wash, delivery of the order at a remote location may be instructed, so as not to cause delay for later-arriving customers. Such an option may be appropriate where a customer did not place an order prior to arrival at the shopping facility so that the order must be assembled/fulfilled entirely following arrival.

As should be evident, the systems and processes described herein overlap and may be combined with one another. For example, system 100 (involving a customer-selected pick up time or time window), system 600 (visual representation showing availability of pick up times at different shopping facilities), system 800 (driving patterns), and/or system 1000 (pick up in conjunction with automatic vehicle wash) might be combined in some manner with one another, in whole or in part. Similarly, steps from different processes might also be combined and/or interchanged with other steps.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for arranging pick up of requested products at shopping facilities, the system comprising:
    a plurality of shopping facilities with a plurality of types of products, each shopping facility having an order pick up area configured for pick up of orders of products, the order pick up areas of the plurality of shopping facilities being configured for transfer of orders made available for pick up;
    an order including a time period during which an orderer requests that the order be available for pick up, as assembled;
    an electronic interface configured to receive the order and configured to receive permission to access global positioning system (GPS) tracking software on a computing device; and
    a control circuit configured to:
        determine order availability time at each of the plurality of shopping facilities;
        determine a subset of the plurality of shopping facilities where the assembled order would be available at the shopping facility within the time period requested;
        transmit a location of at least one of the subset of shopping facilities;
        in response to selection of a shopping facility from the subset of shopping facilities, transmit a first signal to the selected shopping facility instructing the order be assembled and made available for transfer during the time period requested by the orderer at the order pick up area of the selected shopping facility;
        in response to GPS tracking software on the computing device indicating arrival at a predetermined distance from the selected shopping facility, transmit a second signal to the selected shopping facility to transfer the assembled order; and
        transmit a request for delivery to a reference location based on the order not being available during the requested time period at any of the plurality of shopping facilities in view of the order availability time at each shopping facility.

2. The system of claim 1, wherein one or more of the order pick up areas of the plurality of shopping facilities are outside of the shopping facilities and are configured to facilitate transfer of the assembled order at a vehicle.

3. The system of claim 1, wherein one or more of the order pick up areas of the plurality of shopping facilities are inside the shopping facilities.

4. The system of claim 1, further comprising a software application configured to be executed on the computing device, the software application configured to enable entry and transmission of the order from the computing device.

5. The system of claim 1, wherein the electronic interface comprises a shopping server configured to serve as a platform for input of order information to the electronic interface.

6. The system of claim 1, wherein the control circuit is configured to transmit a request for selection of the shopping facility where the order is to be made available for pick up.

7. The system of claim 6, wherein the control circuit is configured to determine and transmit a route from a reference location to the selected shopping facility.

8. The system of claim 6, wherein the control circuit is configured to transmit confirmatory instructions to the selected shopping facility to make the order available during the requested time period.

9. The system of claim 1, further comprising at least one inventory database with inventory data to determine if one or more of the plurality of shopping facilities has products requested in the order.

10. The system of claim 1, wherein the control circuit is configured:
    to calculate a driving time from a reference location to each of the subset of shopping facilities;
    to compare order availability time at each of the subset of shopping facilities;
    to determine a shopping facility from the subset of shopping facilities that will allow earliest pick up in view of driving time and order availability corresponding to each shopping facility; and
    to transmit a location of the shopping facility with an earliest pick up time.

11. The system of claim 1, wherein the control circuit is configured:
    to calculate a driving time from the reference location to each of the plurality of shopping facilities; and
    to transmit the request for delivery to the reference location based, at least in part, on driving time.

12. A method for arranging pick up of requested products at shopping facilities, the method comprising:
    by an electronic interface, receiving an order including a time period during which an orderer requests that the order be available for pick up, as assembled;
    by the electronic interface, receiving permission to access global positioning system (GPS) tracking software on a computing device;
    by a control circuit:
        determining order availability time at each of a plurality of shopping facilities;
        determining a subset of the plurality of shopping facilities where the assembled order would be available at the shopping facility within the time period requested, the plurality of shopping facilities each having a plurality of types of products and having an order pick up area configured for pick up of orders of products, the order pick up areas of the plurality of shopping facilities being configured for transfer of orders made available for pick up;
        transmitting a location of at least one of the subset of shopping facilities;
        in response to selection of a shopping facility from the subset of shopping facilities, transmitting a first signal to the selected shopping facility instructing the order be assembled and made available for transfer during the time period requested by the orderer at the order pick up area of the selected shopping facility;
        in response to GPS tracking software on the computing device indicating arrival at a predetermined distance from the selected shopping facility, transmitting a second signal to the selected shopping facility to transfer the assembled order; and
        transmitting a request for delivery to a reference location based on the order not being available during the requested time period at any of the plurality of shopping facilities in view of the order availability time at each shopping facility.

13. The method of claim 12, wherein one or more of the order pick up areas of the plurality of shopping facilities are outside of the shopping facilities and are configured to facilitate transfer of the assembled order at a vehicle.

14. The method of claim 12, wherein one or more of the order pick up areas of the plurality of shopping facilities are inside the shopping facilities.

15. The method of claim 12, further comprising, by a software application configured to be executed on the computing device, transmission of the order from the computing device.

16. The method of claim 12, further comprising, by the control circuit, transmitting a request for selection of the shopping facility where the order is to be made available for pick up.

17. The method of claim 12, further comprising, by the control circuit:
   calculating a driving time from a reference location to each of the subset of shopping facilities;
   comparing order availability time at each of the subset of shopping facilities;
   determining the shopping facility from the subset of shopping facilities that will allow earliest pick up in view of driving time and order availability corresponding to each shopping facility; and
   transmitting a location of the shopping facility with an earliest pick up time.

18. The method of claim 12, further comprising, by the control circuit:
   calculating a driving time from the reference location to each of the plurality of shopping facilities;
   transmitting the request for delivery to the reference location based, at least in part, on driving time.

* * * * *